(12) United States Patent
Unagami

(10) Patent No.: US 12,154,148 B2
(45) Date of Patent: Nov. 26, 2024

(54) CONTROL METHOD, CONTROLLER, DATA STRUCTURE, AND ELECTRIC POWER TRANSACTION SYSTEM

(71) Applicant: Panasonic Intellectual Property Corporation of America, Torrance, CA (US)

(72) Inventor: Yuji Unagami, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 18/085,976

(22) Filed: Dec. 21, 2022

(65) Prior Publication Data

US 2023/0132297 A1     Apr. 27, 2023

Related U.S. Application Data

(63) Continuation of application No. 16/256,211, filed on Jan. 24, 2019, now Pat. No. 11,568,457.

(Continued)

(30) Foreign Application Priority Data

Oct. 10, 2018   (JP) ............................... 2018-191779

(51) Int. Cl.
*G06Q 30/06*        (2023.01)
*G06Q 20/06*        (2012.01)
(Continued)

(52) U.S. Cl.
CPC ........... *G06Q 30/06* (2013.01); *G06Q 20/065* (2013.01); *G06Q 20/382* (2013.01);
(Continued)

(58) Field of Classification Search
CPC ................. G06Q 20/00–425; G06Q 30/00–08
See application file for complete search history.

(56) References Cited

U.S. PATENT DOCUMENTS 6,900,556 B2    5/2005  Provanzana et al.
2009/0034739 A1  2/2009  Teranishi et al.
(Continued)

FOREIGN PATENT DOCUMENTS

CN    107481141 A    12/2017
JP    2011-101534 A   5/2011
(Continued)

OTHER PUBLICATIONS

Communication under R71(3) EPC dated Jun. 20, 2023 in corresponding European Patent Application No. 19152778.7, 103 pages.

(Continued)

*Primary Examiner* — Mohammad A. Nilforoush
(74) *Attorney, Agent, or Firm* — Wenderoth, Lind & Ponack, L.L.P.

(57) ABSTRACT

A control method including: receiving first transaction data including a first electronic signature from the a home of a first user; verifying whether the received first electronic signature included in the first transaction data is valid; verifying validity of the received first transaction data; when the first electronic signature and the validity of the first transaction data are verified successfully, executing a first consensus algorithm for the first transaction data; and when the validity of the first transaction data is verified according to the first consensus algorithm, recording a block including the first transaction data in a distributed ledger. The first electronic signature is a group signature assigned to a group to which the first user belongs.

11 Claims, 18 Drawing Sheets

Related U.S. Application Data

(60) Provisional application No. 62/623,112, filed on Jan. 29, 2018.

(51) Int. Cl.
    *G06Q 20/38*     (2012.01)
    *G06Q 40/04*     (2012.01)
    *G06Q 50/06*     (2024.01)
    *H04L 9/30*     (2006.01)
    *H04L 9/32*     (2006.01)
    *G06F 21/62*     (2013.01)

(52) U.S. Cl.
CPC ..... *G06Q 20/3825* (2013.01); *G06Q 20/3829* (2013.01); *G06Q 20/389* (2013.01); *G06Q 40/04* (2013.01); *G06Q 50/06* (2013.01); *H04L 9/30* (2013.01); *H04L 9/3247* (2013.01); *G06F 21/6245* (2013.01); *G06Q 2220/00* (2013.01)

(56) References Cited

U.S. PATENT DOCUMENTS

| | | |
|---|---|---|
| 2012/0233060 A1 | 9/2012 | Terano et al. |
| 2015/0294309 A1* | 10/2015 | Busser .................. H04L 63/126 705/40 |
| 2017/0103468 A1 | 4/2017 | Orsini et al. |
| 2017/0358041 A1 | 8/2017 | Forbes, Jr. et al. |
| 2017/0329980 A1 | 11/2017 | Hu et al. |
| 2018/0150865 A1 | 5/2018 | Arora |
| 2018/0182048 A1 | 6/2018 | Stöcker et al. |
| 2018/0204191 A1 | 7/2018 | Wilson |
| 2018/0300741 A1* | 10/2018 | Leonard ................. G06Q 30/08 |
| 2019/0036712 A1 | 1/2019 | Qiu |
| 2019/0089155 A1* | 3/2019 | Cui .......................... G05F 1/66 |
| 2019/0123580 A1* | 4/2019 | Bindea ................. G05B 13/026 |
| 2019/0165938 A1 | 5/2019 | Lu et al. |
| 2019/0165948 A1 | 5/2019 | Sako et al. |
| 2019/0172159 A1 | 6/2019 | Sun |
| 2020/0349616 A1 | 11/2020 | El Kaafarani et al. |

FOREIGN PATENT DOCUMENTS

| | | |
|---|---|---|
| WO | 2001/071459 | 3/2000 |
| WO | 0171459 | 9/2001 |
| WO | 2017/032541 A1 | 3/2017 |
| WO | 2017/182601 | 4/2017 |
| WO | 2017/199053 A1 | 11/2017 |

OTHER PUBLICATIONS

"Mizuho Industry Focus, How Digital Innovation Changes Business—exploring problems and strategies based on noteworthy effort—", Edited/Published by Mizuho Bank, Industry Research Division, vol. 57, No. 1, Sep. 28, 2017 (URL:https://www.mizuhobank.co.jp/corporate/bizinfo/industry/sangyou/m1057.html) with partial English translation.

Mihir Bellare, et al., "Foundations of Group Signatures: Formal Definitions, Simplified Requirements, and a Construction Based on General Assumptions", [online] Advances in Cryptology—Eurocrypt'03, Lecture Notes in Computer Science, vol. 2656, E. Biham ed., Springer-Verlag, 2003 (URL:https://cseweb.ucsd.edu/~mihir/papers/gs.pdf).

Jianchao Hou et al., "Applying the blockchain technology to promote the development of distributed photovoltaic in China", International Journal of Energy Research, vol. 42, No. 6, Jan. 22, 2018, pp. 2050-2069.

Chenghua Zhang et al., "Review of Existing Peer-to Peer Energy Trading Projects", Energy Procedia, vol. 105, May 1, 2017, pp. 2563-2568.

Extended European Search Report issued Jul. 8, 2019 in corresponding European Patent Application No. 19152778.7.

David Chawm, et al. "Group Signatures", D.W. Davies (Ed.): Advances in Cryptology—Eurocrypt '91, LNCS 547, pp. 257-265, 1991 (Year: 1991).

Jan Camenisch et al., "Efficient Group Signature Schemes for Large Groups", Advances in Cryptology | Crypto '97 (Year: 1997).

Extended European Search Report dated Dec. 14, 2023 in counterpart European patent application No. 23204955.1, 10 pages.

\* cited by examiner

FIG. 4

```
                                                   ,-105a
┌─────────────────────────────────────────────────┐
│           INPUT ELECTRIC POWER                  │
│           SELLING INFORMATION                   │
│                                                 │
│       DATE      [                    ]          │
│                                                 │
│   ELECTRIC POWER [              kWh]            │
│   SELLING AMOUNT                                │
│                                                 │
│     UNIT PRICE  [              YEN]             │
│                                                 │
└─────────────────────────────────────────────────┘
```

FIG. 5

```
                                                   ,-105b
┌─────────────────────────────────────────────────┐
│           INPUT ELECTRIC POWER                  │
│           BUYING INFORMATION                    │
│                                                 │
│       DATE      [                    ]          │
│                                                 │
│   ELECTRIC POWER [              kWh]            │
│   SELLING AMOUNT                                │
│                                                 │
│     UNIT PRICE  [              YEN]             │
│                                                 │
└─────────────────────────────────────────────────┘
```

FIG. 8A

ELECTRIC POWER SELLING LIST

| BLOCKCHAIN ADDRESS | DATE | ELECTRIC POWER SELLING AMOUNT (kWh) | UNIT PRICE (YEN) | GROUP SIGNATURE |
|---|---|---|---|---|
| 0x03547921 | 2017.12.15 13:00 | 20 | 20 | 0x76af43... |
| 0x06587465 | 2017.12.15 15:00 | 30 | 21 | 0x80bea5... |
| | | | | |
| | | | | |

FIG. 8B

ELECTRIC POWER BUYING LIST

| BLOCKCHAIN ADDRESS | DATE | ELECTRIC POWER BUYING AMOUNT (kWh) | UNIT PRICE (YEN) | GROUP SIGNATURE |
|---|---|---|---|---|
| 0x04587463 | 2017.12.15 13:30 | 10 | 20 | 0x2a5983... |
| 0x08426731 | 2017.12.15 16:00 | 15 | 22 | 0x086321... |
| | | | | |

FIG. 8C

ELECTRIC POWER TRANSACTION LIST

| ELECTRIC POWER SELLER ADDRESS | ELECTRIC POWER BUYER ADDRESS | DATE | TRANSACTION AMOUNT (kWh) | UNIT PRICE (YEN) |
|---|---|---|---|---|
| 0x03547921 | 0x04587463 | 2017.12.15 13:30 | 10 | 20 |
| | | | | |
| | | | | |

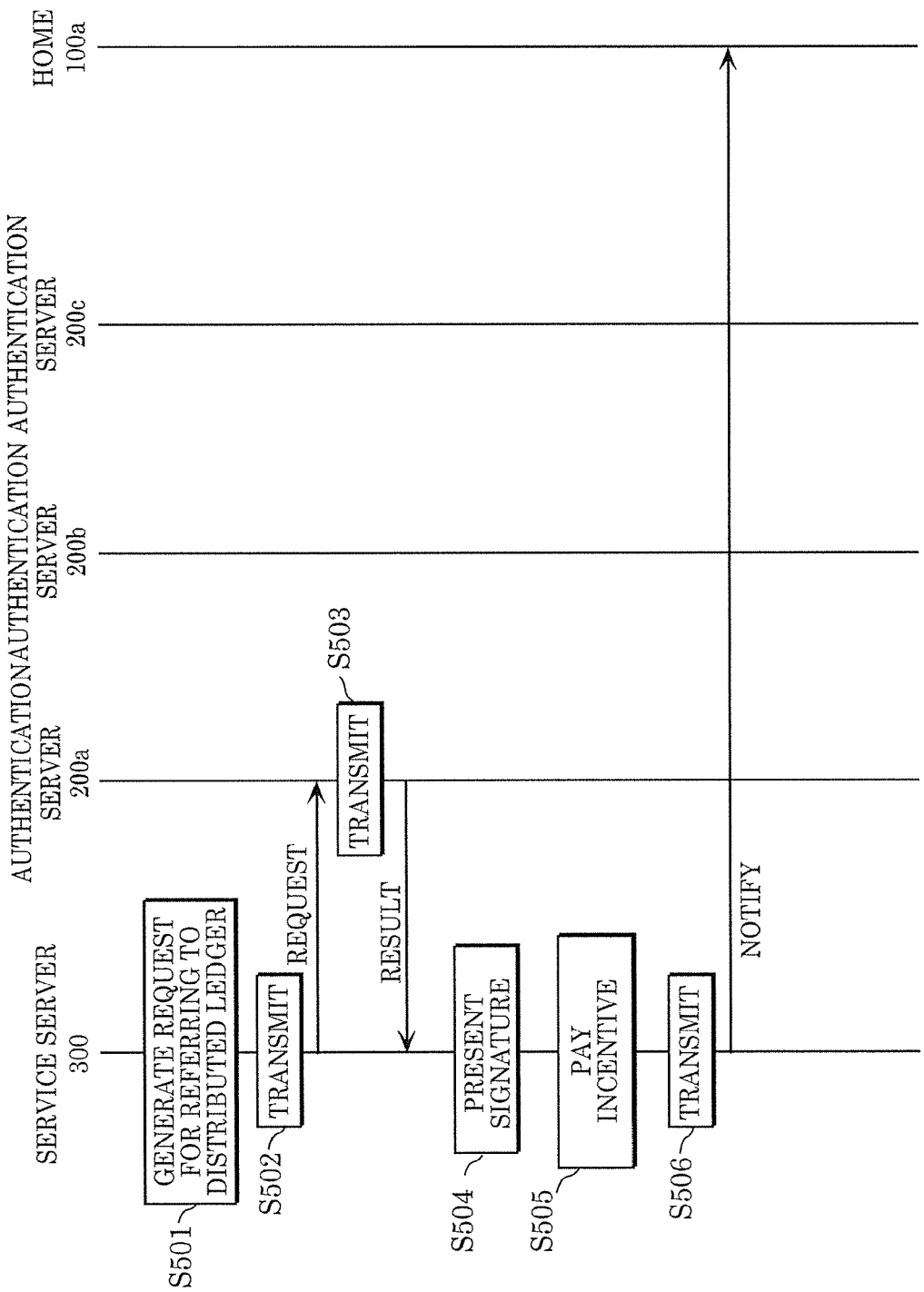

CONTROL METHOD, CONTROLLER, DATA STRUCTURE, AND ELECTRIC POWER TRANSACTION SYSTEM

CROSS REFERENCE TO RELATED APPLICATIONS

This application is a continuation of U.S. application Ser. No. 16/256,211, filed Jan. 24, 2019, which claims the benefits of priorities of U.S. Patent application No. 62/623,112 filed on Jan. 29, 2018 and Japanese Patent Application Number 2018-191779 filed on Oct. 10, 2018, the entire contents of which are hereby incorporated by reference.

BACKGROUND

1. Technical Field

The present disclosure relates to a control method, a controller, a data structure, and an electric power transaction system, and in particular to an electric power transaction system for performing transaction of electric power generated at home, a control method, a controller, and a data structure in the electric power transaction system.

2. Description of the Related Art

Recent years have seen the spread of renewable energy such as solar photovoltaic power generated by solar photovoltaic power generation equipment. Such solar photovoltaic power generation equipment not only uses self-generated electric power, but also sells surplus electric power to electric power companies.

In the future, it is conceivable that surplus electric power is directly sold to neighbors in addition to electric power companies. However, such direct selling and buying of electric power between customers who are a seller and a buyer in a private electric power transaction requires an interagent such as an electric power company because the electric power needs to be sold by the seller and bought by the buyer after successful matching between the seller's selling request and the buyer's buying request.

In comparison, techniques for configuring autonomous distributed systems by utilizing blockchain techniques for private electric power transactions in the electric power field have been studied (for example, see non-patent literature 1: Mizuho Industry Focus, How Digital Innovation Changes Business (Digital Innovation wa Business wo dou Henkaku suruka)—exploring problems and strategies based on noteworthy effort (chumoku no torikumi kara kadai to senryaku wo saguru),—Electric Power—prospects of electric power sharing economy utilizing blockchain technology (blockchain gijutsu wo katuyou shita demyoku sharing economy no tenbou—, Vol. 57, No. 1, 2017 (URL:https://www.mizuhobank.co.jp/corporate/bizinfo/industry/sangyou/m1057.html)). According to the technique disclosed in non-patent literature 1, for example, a seller who owns solar photovoltaic power generation equipment wants to sell surplus electric power to a buyer, the seller can transfer the asset to the buyer using a blockchain technique without using an interagent such as an electric power company.

SUMMARY

However, in the technique disclosed in non-patent literature 1, the transaction data of the electric power seller is made public, which involves a problem that presence or absence of the seller in the seller's home may be estimated based on time or electric power amount at or in which the seller can sell the electric power. In short, the technique disclosed in non-patent literature 1 may lead to leakage of privacy information.

The present disclosure was made in view of this, and has an object to provide a control method, etc. for avoiding leakage of privacy information.

In view of the object, a control method according to an aspect of the present disclosure is a control method performed in an electric power transaction system including: first electric power equipment which is used by a first user; second electric power equipment which is used by a second user; and a plurality of servers which are connected to the first electric power equipment and the second electric power equipment via a network so as to enable communication with each other, the control method being executed by a first server included in the plurality of servers and including: receiving first transaction data from the first electric power equipment via the network, the first transaction data including: a first blockchain address which is an identifier for identifying at least one of the first user and the first electric power equipment; electric power selling amount information indicating an amount of electric power which can be sold by the first electric power equipment; and a first electronic signature associated with the first user; verifying whether the first electronic signature included in the first transaction data received is valid; verifying validity of the first transaction data received; when the first electronic signature and the validity of the first transaction data are verified successfully, executing a first consensus algorithm for reaching a consensus that validity of the first transaction data is verified, together with a plurality of second servers different from the first server among the plurality of servers; and when the consensus that the validity of the first transaction data is verified was reached according to the first consensus algorithm, recording a block including the first transaction data in a distributed ledger of the first server, wherein the first electronic signature is a first group signature assigned to a first group of users including the first user.

It is to be noted that these general and specific aspects may be implemented using a system, a method, an integrated circuit, a computer program, or a computer-readable recording medium such as a CD-ROM, or any combination of systems, methods, integrated circuits, computer programs, or computer-readable recording media.

According to the control method, etc. of the present disclosure, it is possible to avoid leakage of privacy information.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 4 is a diagram illustrating an example of an input display screen for receiving, as input, electric power selling request information according to the embodiment.

FIG. 5 is a diagram illustrating an example of an input display screen for receiving, as input, electric power buying request information according to the embodiment.

FIG. 8A is a diagram illustrating an electric power selling list according to the embodiment.

FIG. 8B is a diagram illustrating an electric power buying list according to the embodiment.

FIG. 8C is a diagram illustrating an example of an electric power transaction list according to the embodiment.

FIG. 16 is a sequence diagram of incentive paying processing performed between one of the two homes and the service server according to the embodiment.

DETAILED DESCRIPTION OF THE EMBODIMENT

Figure 1:
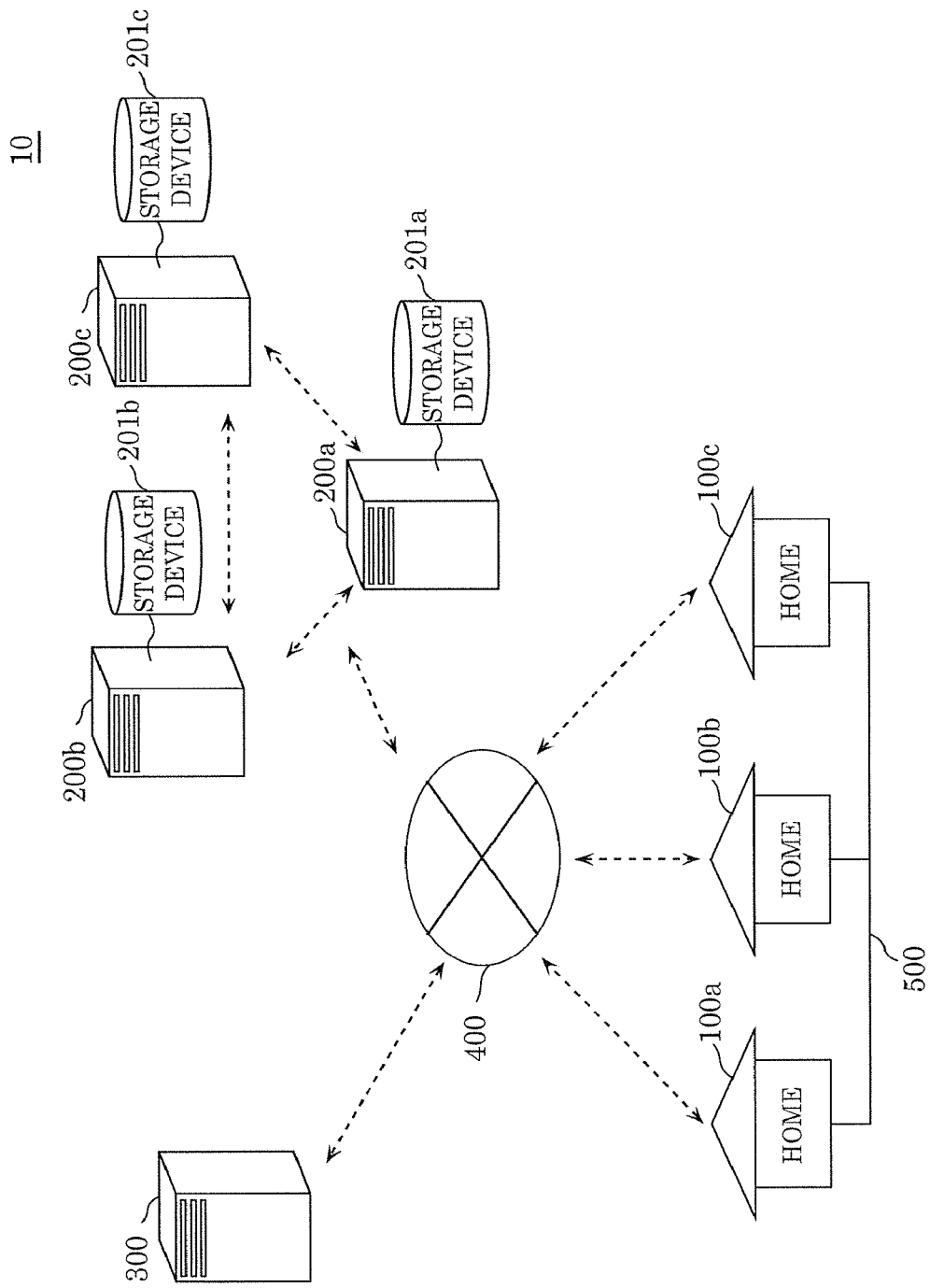
FIG. 1 is a diagram illustrating an example of an overall configuration of an electric power transaction system according to an embodiment.

A control method according to an aspect of the present disclosure is a control method performed in an electric power transaction system including: first electric power equipment which is used by a first user; second electric power equipment which is used by a second user; and a plurality of servers which are connected to the first electric power equipment and the second electric power equipment via a network so as to enable communication with each other, the control method being executed by a first server included in the plurality of servers and including: receiving first transaction data from the first electric power equipment via the network, the first transaction data including: a first blockchain address which is an identifier for identifying at least one of the first user and the first electric power equipment; electric power selling amount information indicating an amount of electric power which can be sold by the first electric power equipment; and a first electronic signature associated with the first user; verifying whether the first electronic signature included in the first transaction data received is valid; verifying validity of the first transaction data received; when the first electronic signature and the validity of the first transaction data are verified successfully, executing a first consensus algorithm for reaching a consensus that validity of the first transaction data is verified, together with a plurality of second servers different from the first server among the plurality of servers; and when the consensus that the validity of the first transaction data is verified was reached according to the first consensus algorithm, recording a block including the first transaction data in a distributed ledger of the first server. The first electronic signature is a first group signature assigned to a first group of users including the first user.

In this way, a signature included in transaction data from a home is a group signature.

In this way, even when the first transaction data of the blockchain indicating an electric power selling request is made public, it is impossible to identify the home and the user in the home from the first transaction data, and thus it is possible to avoid leakage of privacy information.

In addition, the control method may further include: receiving second transaction data from the second electric power equipment via the network, the second transaction data including: a second blockchain address which is an identifier for identifying at least one of the second user and the second electric power equipment; electric power buying amount information indicating an amount of electric power which can be bought by the second electric power equipment; and a second electronic signature associated with the second user; verifying whether the second electronic signature included in the second transaction data received is valid; verifying validity of the second transaction data received; when the second electronic signature and the validity of the second transaction data are verified successfully, executing a second consensus algorithm for reaching a consensus that validity of the second transaction data is verified, together with the plurality of second servers; and when the consensus that the validity of the second transaction data is verified was reached according to the second consensus algorithm, recording a block including the second transaction data in the distributed ledger of the first server. The second electronic signature may be a second group signature assigned to a second group of users including the second user.

In this way, even when the transaction data of the second blockchain indicating an electric power buying request is made public, it is impossible to identify the home and the user in the home from the second transaction data, and thus it is possible to avoid leakage of privacy information.

In addition, the first transaction data may further include a first time stamp indicating a date and time period during which the electric power can be sold, and the second transaction data may include a second time stamp indicating a date and time period during which the electric power can be bought. The control method may further include: searching for matching electric power selling and buying requests for an electric power transaction by comparing (i) the electric power selling amount information and the first time stamp and (ii) the electric power buying amount information and the second time stamp recorded in the distributed ledger; when matching electric power selling and buying requests for an electric power transaction are searched out successfully, generating third transaction data including: the first blockchain address and the second blockchain address; and an amount of electric power to be sold and bought in the electric power transaction; transferring the third transaction data to the plurality of second servers, and executing a third consensus algorithm for reaching a consensus that validity of the third transaction data is verified, together with the plurality of second servers; and when the consensus that the validity of the third transaction data is verified was reached according to the third consensus algorithm, recording a block including the third transaction data in the distributed ledger.

In this way, even when the third transaction data of the blockchain indicating the result of matching between selling and buying requests for the electric power transaction is made public, it is impossible to identify the home and the user in the home from the third transaction data, and thus it is possible to avoid leakage of privacy information.

In addition, the control method may further include: when the electric power transaction was agreed upon, notifying the first electric power equipment and the second electric power equipment that the electric power transaction was agreed upon; receiving fourth transaction data from the first electric power equipment via the network, the fourth transaction data including: a fourth blockchain address which is an identifier for identifying at least one of the first user and the first electric power equipment; electric power transmitting amount information indicating an amount of electric power which the first electric power equipment transmitted to the second electric power equipment; and the first electronic signature; verifying whether the first electronic signature included in the fourth transaction data received is valid, and verifying validity of the fourth transaction data received; when the first electronic signature and the validity of the fourth transaction data are verified successfully, executing a fourth consensus algorithm for reaching a consensus that validity of the fourth transaction data is verified, together with the plurality of second servers; when the consensus that the validity of the fourth transaction data is verified was reached according to the fourth consensus algorithm, recording a block including the fourth transaction data in the distributed ledger of the first server; receiving fifth transaction data from the second electric power equipment via the network, the fifth transaction data including: a fifth blockchain address which is an identifier for identifying at least one of the second user and the second electric power equipment; electric power receiving amount information indicating an amount of electric power which the second electric power equipment received from the first electric power equipment; and the second electronic signature; verifying whether the second electronic signature included in the fifth transaction data received is valid, and verifying validity of the fifth transaction data received; when the second electronic signature and the validity of the fifth transaction data are verified successfully, executing a fifth consensus algorithm for reaching a consensus that the validity of the fifth transaction data is verified, together with the plurality of second servers; and when the consensus that the validity of the fifth transaction data is verified was reached according to the fifth consensus algorithm, recording a block including the fifth transaction data in the distributed ledger of the first server.

In this way, even when the transaction data of the blockchain indicating the matching result is made public, it is impossible to identify the homes and the users in the homes who performed the transaction from the transaction data, and thus it is possible to avoid leakage of privacy information.

In addition, the electric power transaction system may further include a service server. The control method may include: generating, by the service server, a group signature key assigned to a group to which the first user and the second user belong. The generating may include: generating a first secret key for the group signature to be used to generate the first electronic signature, and transmitting the first secret key to the first electric power equipment; generating a second secret key for the group signature to be used to generate the second electronic signature, and transmitting the second secret key to the second electric power equipment; and distributing a public key which is a signature verifying key for the group signature to the plurality of servers.

In addition, the electric power transaction system may further include a service server. The control method may include: generating, by the service server, a group signature key assigned to a group to which the first user belongs. The generating may include: generating a group signature key assigned to the first group to which a plurality of users including the first user belong; generating a first secret key for the group signature to be used to generate the first electronic signature, and transmitting the first secret key to the first electric power equipment; and distributing a public key which is a signature verifying key for the group signature assigned to the first group to the plurality of servers.

In addition, the electric power transaction system may further include a service server. The control method may include: generating, by the service server, a group signature key assigned to a group to which the second user belong. The generating may include: generating a group signature key assigned to the second group to which a plurality of users including the second user belong; generating a second secret key for the group signature to be used to generate the second electronic signature, and transmitting the second secret key to the second electric power equipment; and distributing a public key which is a signature verifying key for the group signature assigned to the second group to the plurality of servers.

In addition, the control method may further include: obtaining, by the service server, transaction data with reference to the distributed ledger of the first server; and presenting the group signature included in the transaction data obtained, and identifying a user who made the group signature, the presenting and identifying being performed by the service server.

In addition, the control method may further include: after an incentive was paid to the user identified, notifying, by the service server, that the incentive was paid to the user.

In addition, the second blockchain address may be generated, for each electric power transaction, as an identifier for identifying at least one of the second user and the second electric power equipment by a controller of the second electric power equipment.

In addition, the first blockchain address may be generated, for each electric power transaction, as an identifier for identifying at least one of the first user and the first electric power equipment by a controller of the first electric power equipment.

In addition, the executing of the first consensus algorithm may include: receiving a first report indicating whether the validity of the first transaction data was successfully verified from each of the plurality of second servers; determining whether the number of first reports exceeds a predetermined number; and when the number of first reports exceeds the predetermined number, determining that a consensus that the validity of the first transaction data is verified was reached according to the first consensus algorithm.

In addition, the executing of the second consensus algorithm may include: receiving a second report indicating whether the validity of the second transaction data was successfully verified from each of the plurality of second servers; determining whether the number of second reports exceeds a predetermined number; and when the number of second reports exceeds the predetermined number, determining that a consensus that the validity of the second transaction data is verified was reached according to the second consensus algorithm.

In addition, each of the first electric power equipment and the second electric power equipment may include at least one of a solar photovoltaic power generating apparatus, a gas electric power generating apparatus, and a wind electric power generating apparatus.

Furthermore, a controller according to an aspect of the present disclosure is a controller which controls first electric power equipment in an electric power transaction system including: the first electric power equipment which is used by a first user; second electric power equipment which is used by a second user; and a plurality of servers capable of communicating with the first electric power equipment and the second electric power equipment via a network, the controller including: a processor; and a memory that stores a program for causing the processor to perform predetermined processing. The predetermined processing includes: determining whether a surplus electric power amount in the first electric power equipment is greater than or equal to a predetermined value; generating first transaction data when the surplus electric power amount in the first electric power equipment is greater than or equal to the predetermined value, the first transaction data including: a first blockchain address which is an identifier for identifying at least one of the first user and the first electric power equipment; electric power selling amount information indicating an amount of electric power which can be sold by the first electric power equipment; and a first electronic signature associated with the first user; and transmitting the first transaction data to a first server included in the plurality of servers via the network. When the validity of the first transaction data was verified by the plurality of servers and a block including the first transaction data is recorded in a distributed ledger of each of the plurality of servers, a display is caused to display electric power registration information which indicates the electric power selling amount information and an electric power selling request by the first electric power equipment, and the first electronic signature is a group signature assigned to a group to which the first user belongs.

Furthermore, a control method according to an aspect of the present disclosure is a control method for controlling a display which displays information about an electric power transaction in first electric power equipment in an electric power transaction system including: first electric power equipment which is used by a first user; second electric power equipment which is used by a second user; and a plurality of servers capable of communicating with the first electric power equipment and the second electric power equipment via a network, the control method including: when a surplus electric power amount of the first electric power is greater than or equal to a predetermined value, causing the display to display electric power registration information which indicates electric power selling amount information and an electric power selling request of the first electric power equipment during a period from when first transaction data was transmitted to a first server included in the plurality of servers via the network to when validity of the first transaction data was verified by the plurality of servers, the first transaction data including: a first blockchain address which is an identifier for identifying at least one of the first user and the first electric power equipment; the electric power selling amount information which indicates an amount of electric power which can be sold by the first electric power equipment; and a first electronic signature associated with the first user; causing the display to display the electric power registration information when the validity of the first transaction data was verified by the plurality of servers; and when no consensus that the validity of the first transaction data is verified was reached by the plurality of servers, causing the display to display failure information indicating that no consensus that the validity of the first transaction data is verified was reached by the plurality of servers. The first electronic signature is a group signature assigned to the group to which the first user belongs.

A data structure according to an aspect of the present disclosure is a data structure of each of blocks recorded in a blockchain for use in an electric power transaction system including: first electric power equipment which is used by a first user; second electric power equipment which is used by a second user; and a plurality of servers which are connected to the first electric power equipment and the second electric power equipment via a network so as to enable communication with each other, the data structure including: a blockchain address which is included in a block generated using a secret key of the first user, the blockchain address being an identifier for identifying at least one of the first user and the first electric power equipment; electric power selling amount information indicating an amount of electric power which can be sold by the first electric power equipment; and a first electronic signature which is assigned to a group to which the first user belongs and is associated with the first user. The electric power selling amount information is used for matching between an electric power selling request and an electric power buying request for an electric power transaction, the matching being performed by comparing the electric power selling amount information with electric power buying amount information indicating an amount of electric power which can be bought by the second electric power equipment and a second time stamp indicating a second date and period in which the amount of electric power can be bought.

An electric power transaction system according to an aspect of the present disclosure is an electric power transaction system, further including: first electric power equipment which is used by a first user; second electric power equipment which is used by a second user; and a plurality of servers which are connected to the first electric power equipment and the second electric power equipment via a network so as to enable communication with each other. In the system, a first controller included in the first electric power equipment: generates first transaction data including: a first blockchain address which is an identifier for identifying at least one of the first user and the first electric power equipment; electric power selling amount information indicating an amount of electric power which can be sold by the first electric power equipment; and a first electronic signature associated with the first user; and transmits the first transaction data to a first server included in the plurality of servers via the network. In the system, a second controller included in the second electric power equipment: generates second transaction data including: a second blockchain address which is an identifier for identifying at least one of the second user and the second electric power equipment; electric power buying amount information indicating an amount of electric power which can be bought by the second electric power equipment; a second time stamp indicating a date and time period during which the electric power can be bought; and a second electronic signature associated with the second user; and transmitting the second transaction data to a second server included in the plurality of servers via the network. The first server: verifies whether the first electronic signature included in the first transaction data received is valid; verifies validity of the first transaction data received;

and when the first electronic signature and the validity of the first transaction data are verified successfully, transferring the first transaction data to the plurality of servers other than the first server. The second server: verifies whether the second electronic signature included in the second transaction data received is valid; verifies validity of the second transaction data received; and when the second electronic signature and the validity of the second transaction data are verified successfully, transfers the second transaction data to the plurality of servers other than the second server. The plurality of servers: execute a first consensus algorithm for reaching a consensus that the validity of the first transaction data is verified; when the consensus that the validity of the first transaction data is verified was reached according to the first consensus algorithm, record a block including the first transaction data in a distributed ledger of each of the plurality of servers; execute a second consensus algorithm for reaching a consensus that the validity of the second transaction data is verified; and when a consensus that the validity of the second transaction data is verified was reached by the second consensus algorithm, record a block including the second transaction data in the distributed ledger of each of the plurality of servers.

Hereinafter, an embodiment is described with reference to the drawings. It is to be noted that each of the embodiment and variations thereof described below indicates a specific example. The numerical values, shapes, materials, constituent elements, the arrangement and connection of the constituent elements, steps, the processing order of the steps etc. indicated in the following exemplary embodiment and variations thereof are mere examples, and therefore do not limit the scope of the present disclosure. The present disclosure is determined based on the recitation of the claims. Accordingly, among the constituent elements in the following exemplary embodiment and variations thereof, constituent elements not recited in any one of the independent claims that defines the most generic concept of the present disclosure are not necessarily required to overcome conventional disadvantage(s), and described as constituent elements which constitute the exemplary embodiment and variations thereof.

Embodiment

First, a configuration of a system according to the present disclosure is described.

[1. The Configuration of the System]

Electric power transaction system 10 performs electric power transaction utilizing a blockchain technique by using a group signature for enabling each group member to provide his or her signature anonymously as a group member, which secures privacy information.

Here, a group signature is described. The use of a group signature only requires each member of a group to authenticate that he or she belongs to the group. With the group signature, anyone can verify whether the signature was provided by an authenticated group member. The group signature has a feature of enabling verification that the group signature was provided by a group member while disabling identification of the group member. It is to be noted that the group signature having the feature allows only a manager who issued the group signature to identify the group member who provided the group signature, as necessary, for example, when a problem occurred.

Hereinafter, a description is given of the electric power transaction system, etc. according to an embodiment with reference to the drawings.

[1.1 An Overall Configuration of Electric Power Transaction System 10]

FIG. 1 is a diagram illustrating an example of the overall configuration of electric power transaction system 10 according to the embodiment.

As illustrated in FIG. 1, electric power transaction system 10 includes: homes 100a, 100b, and 100c, authentication servers 200a, 200b, and 200c, and service server 300. These constituent elements are connected via communication network 400. In addition, homes 100a, 100b, and 100c are connected via electric power network 500. Electric power network 500 is a network in which electric power is sold and bought between homes. Electric power network 500 may be an exclusive line, or may be an electric power network provided by an electric power company.

Authentication servers 200a, 200b, and 200c are connected to storage devices 201a, 201b, and 201c. Authentication server 200a, etc. may be connected to storage device 201a, etc. via communication network 400, or may include storage device 201a inside. Storage device 201a includes a distributed ledger in which a blockchain composed of transaction data blocks is electronically recorded.

It is to be noted that FIG. 1 illustrates a non-limiting example where electric power transaction system 10 includes three homes and three authentication servers. In other words, electric power transaction system 10 may include four or more homes and four or more authentication servers.

[1.2 A Configuration of Home 100a]

Homes 100b and 100c have the same configuration, and thus home 100a is taken as an example in the following description.

Figure 2:
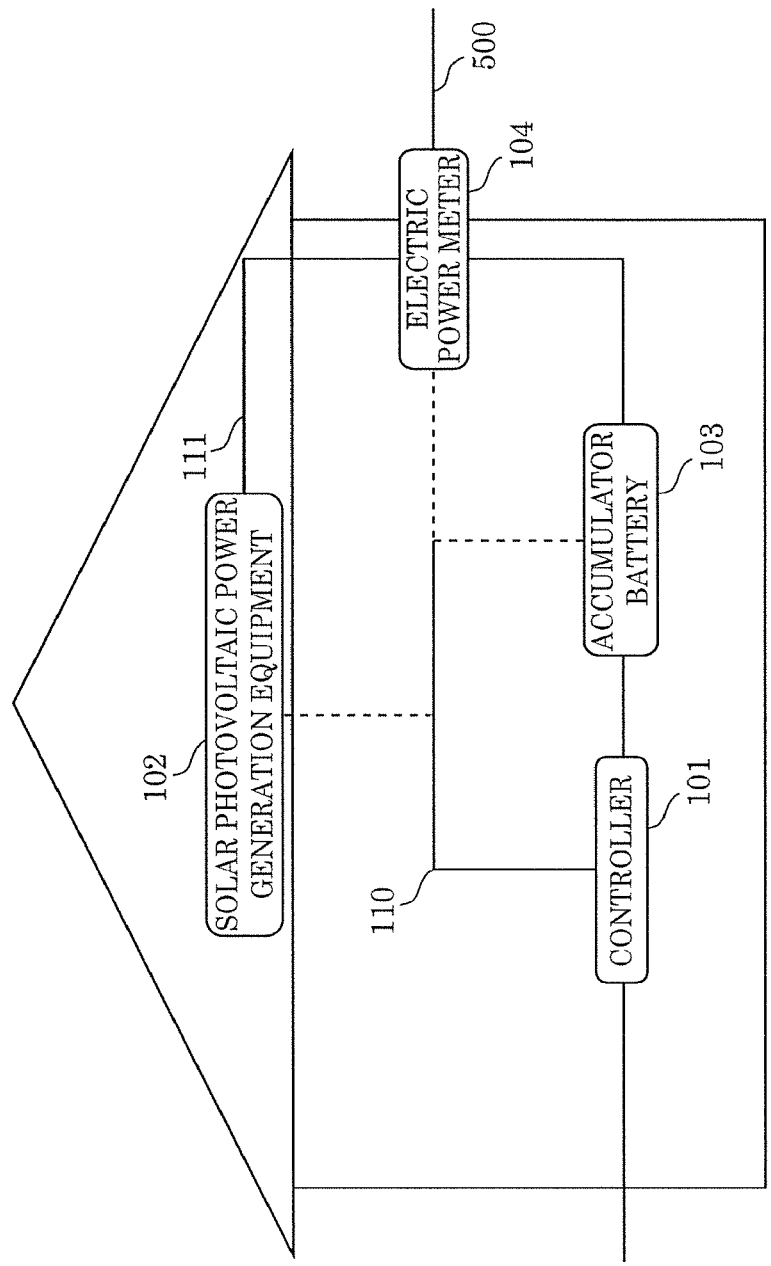
FIG. 2 is a diagram illustrating an example of an overall configuration of a home according to the embodiment.

FIG. 2 is a diagram illustrating an example of the overall configuration of home 100a according to the embodiment.

As illustrated in FIG. 2, home 100a includes: controller 101; solar photovoltaic power generation equipment 102; accumulator battery 103; and electric power meter 104. Controller 101, solar photovoltaic power generation equipment 102, accumulator battery 103, and electric power meter 104 are connected via communication network 110. In addition, solar photovoltaic power generation equipment 102, and accumulator battery 103 are connected in electric power network 111, and further to electric power network 500 outside home 100a via electric power meter 104.

Here, home 100a, etc. is an example of a building having electric power equipment which is used by either a first user or a second user, and is for example, a home, but is not limited thereto. Home 100a, etc. may be another building such as a factory. In other words, home 100a, etc. may be any as long as it is a building having an electric power equipment which is used by a user.

<Controller 101>

Controller 101 is, for example, a controller for an energy management system, and for controlling either the first electric power equipment or the second electric power equipment in electric power transaction system 10.

In this embodiment, controller 101 displays an electric power generation state in solar photovoltaic power generation equipment 102, displays an electric power accumulation state in accumulator buttery 103, or receives input of an electric power selling or buying request, etc. Controller 101 controls solar photovoltaic power generation equipment 102 and accumulator buttery 103, and transmits electric power to either electric power network 111 or electric power network 500. Controller 101 manages the amount of electric power transmitted to electric power network 500, and notifies the amount of electric power to authentication server 200a, etc. This is described in detail later.

<Solar Photovoltaic Power Generation Equipment 102>

Solar photovoltaic power generation equipment 102 is an example of a solar photovoltaic power generation apparatus included in either the first electric power equipment or the second electric power equipment. Solar photovoltaic power generation equipment 102 is an apparatus which mounts an electric power generation mechanism for directly converting solar light to electric power using solar battery. Solar photovoltaic power generation equipment 102 accumulates the generated electric power in accumulator battery 103, or transmits the generated electric power to electric power network 500. Solar photovoltaic power generation equipment 102 transmits the generated electric power to electric power network 500 via electric power network 111, for example, according to an electric power transmission instruction from controller 101.

It is to be noted that solar photovoltaic power generation equipment 102 is not limited to a solar photovoltaic power generating apparatus. A gas electric power generating apparatus, a wind electric power generating apparatus, or the like is also possible.

<Accumulator Battery 103>

Accumulator battery 103 accumulates electric power generated by solar photovoltaic power generation equipment 102. Accumulator battery 103 transmits the accumulated electric power, for example, according to an electric power transmission instruction from controller 101. Accumulator battery 103 may accumulate electric power received from electric power network 500, for example, according to an electric power reception instruction from controller 101. It is to be noted that accumulator battery 103 is not an essential element, and may not be included in home 100a.

<Electric Power Meter 104>

Electric power meter 104 is included in either the first electric power equipment or the second electric power equipment, and measures the amount of electric power transmitted to or received from electric power network 500. When one of solar photovoltaic power generation equipment 102 and accumulator battery 103 transmitted electric power to electric power network 500 according to an electric power transmission instruction from controller 101, electric power meter 104 measures the time at which the electric power was transmitted and the amount of the electric power, and notifies the time and amount to controller 101. Electric power meter 104 measures the amount of electric power received from electric power network 500 and used according to an electric power use instruction from controller 101.

Hereinafter, an example of a configuration of controller 101 is described.

[1.3 The Configuration of Controller 101]

Figure 3:
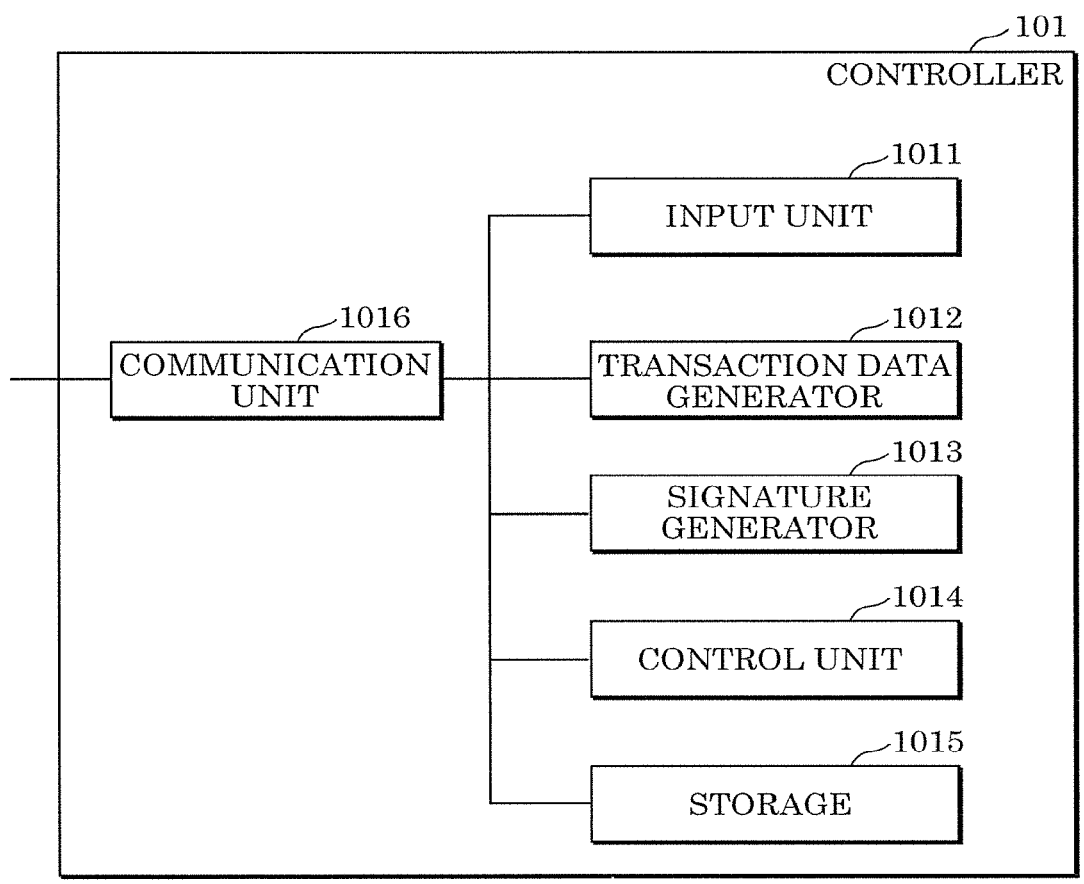
FIG. 3 is a block diagram illustrating a functional configuration of a controller illustrated in FIG. 2.

FIG. 3 is a block diagram illustrating a functional configuration of controller 101 illustrated in FIG. 2.

Controller 101 includes a processor and a memory that stores a program for causing the processor to execute predetermined processing. In other words, controller 101 is implemented by means of the processor executing the predetermined program using the memory. In this embodiment, controller 101 includes: input unit 1011; transaction data generator 1012; signature generator 1013; control unit 1014; storage 1015; and communication unit 1016. Hereinafter, each of the constituent elements is described.

<Input Unit 1011>

FIG. 4 is a diagram illustrating an example of an input display screen for receiving, as input, electric power selling request information according to this embodiment. FIG. 5 is a diagram illustrating an example of an input display screen for receiving, as input, electric power buying request information according to this embodiment.

Input unit 1011 receives, from a user, application information for an electric power transaction, and transmits the application information to service server 300 via communication unit 1016. Input unit 1011 generates an input display screen for allowing the user to input one of an electric power selling request and an electric power buying request.

When an electric power selling request or an electric power buying request is input by the user on the generated input display screen, input unit 1011 transmits the input one of the electric power selling request and the electric power buying request to transaction data generator 1012 and signature generator 1013.

As illustrated in FIG. 4, for example, date, electric power selling amount, and unit price are input by the user on input display screen 105a for receiving electric power selling request information. In the non-limiting example illustrated in FIG. 4, the electric power selling amount is displayed using kWh. The electric power selling amount may be specified as a remaining accumulated electric power amount after electric power selling, or as the ratio of the electric power selling amount with respect to a current accumulated electric power amount. The unit price for electric power selling is not always input by the user, and may be determined by electric power transaction system 10 in advance. Input unit 1011 may present default date, electric power selling amount, and unit price for electric power selling on input display screen 105a, so as to cause the user to input whether the user accepts the default date, etc. by inputting, for example, "approve" or "disapprove".

As illustrated in FIG. 5, for example, date, electric power selling amount, and unit price for electric power buying are input by the user on input display screen 105b for receiving electric power buying request information. In the non-limiting example illustrated in FIG. 5, the electric power buying amount is displayed using kWh. The electric power buying amount may be specified as an accumulated electric power amount after electric power buying. The unit price for electric power buying is not always input by the user, and may be determined by electric power transaction system 10 in advance. Input unit 1011 may present default date, electric power buying amount, and unit price for electric power buying on input display screen 105a, so as to cause the user to input whether he or she accepts the default date, etc. by inputting, for example, "approve" or "disapprove".

<Transaction Data Generator 1012>

Transaction data generator 1012 generates transaction data in a blockchain based on (i) the one of the electric power selling request and the electric power buying request received from input unit 1011 and (ii) signature information received from signature generator 1013. Transaction data generator 1012 may determine whether or not the surplus electric power amount is greater than or equal to a predetermined value, and generate transaction data if the determination result is yes. Here, the predetermined value is, for example, a surplus electric power that is the electric power selling amount indicated in the electric power selling request information received from input unit 1011.

The transaction data generated by transaction data generator 1012 is examples of first transaction data and second transaction data.

The first transaction data includes: a first blockchain address which is an identifier for identifying at least one of the first user and the first electric power equipment; electric power selling amount information indicating the amount of electric power which can be sold by the first electric power equipment; a first time stamp indicating first date and time at which the electric power can be sold; and a first electronic signature associated with the first user. Here, the first electronic signature is a first group signature assigned to the first group of a plurality of users including the first user. The first transaction data may not include the first time stamp.

Second transaction data includes: a second blockchain address which is an identifier for identifying at least one of the second user and the second electric power equipment; electric power buying amount information indicating the amount of electric power which can be bought by the second electric power equipment; a second time stamp indicating first date and time at which the electric power can be bought; and a second electronic signature associated with the second user. Here, the second electronic signature is a second group signature assigned to the second group of a plurality of users including the second user. It is to be noted that the first user and the second user belong to the same group. The second transaction data may not include the second time stamp. The first blockchain address may be generated for each electric power transaction, as an identifier for identifying at least one of the first user and the first electric power equipment, by the controller of the first electric power equipment. The second blockchain address may be generated for each electric power transaction, as an identifier for identifying at least one of the second user and the second electric power equipment, by the controller of the second electric power equipment. In other words, the first blockchain address and the second blockchain address may be one-time addresses.

In this way, in this embodiment, each transaction data generated by transaction data generator 1012 includes: the blockchain address of one of the user and the controller; the one of electric power selling request information and electric power buying request information; and the group signature generated by signature generator 1013.

Transaction data generator 1012 records the generated transaction data onto storage 1015. Transaction data generator 1012 transmits the generated transaction data to at least one of authentication server 200a, etc. via communication unit 1016.

When transaction data generator 1012 received, from electric power meter 104, a notification indicating that electric power was transmitted to electric power network 500, transaction data generator 1012 generates transaction data including the time at which the electric power was transmitted and the amount of the transmitted electric power, and records the time and amount onto storage 1015. Transaction data generator 1012 transmits the generated transaction data to at least one of authentication server 200a, etc. via communication unit 1016. More specifically, the transaction data that transaction data generator 1012 generated upon receiving the notification from electric power meter 104 is examples of fourth transaction data and fifth transaction data.

Fourth transaction data includes: a fourth blockchain address which is an identifier for identifying at least one of the first user and the first electric power equipment; electric power transmission information indicating the amount of electric power which the first electric power equipment transmitted to the second electric power equipment; and the first electronic signature. Fifth transaction data includes: a fifth blockchain address which is an identifier for identifying at least one of the second user and the second electric power equipment; electric power transmission information indicating the amount of electric power which the second electric power equipment received from the second electric power equipment; and the second electronic signature.

<Signature Generator 1013>

Signature generator 1013 generates a group signature based on the one of the electric power selling request information and the electric power buying request information received from input unit 1011. Signature generator 1013 receives a signature generating key from service server 300 and holds the signature generating key in advance.

More specifically, signature generator 1013 receives and holds the signature generating key for an individual user, that is a secret key for providing the group signature that service server 300 generated upon receiving the application information for the electric power transaction service transmitted from input unit 1011 in advance. Signature generator 1013 generates one of a first electronic signature and a second electronic signature which is the group signature, using the signature generating key, based on the one of the electric power selling request information and the electric power buying request information received from input unit 1011.

The group signature may be generated and used using the method disclosed in non-patent literature 2 (Mihir Bellare and two other persons, "Foundations of Group Signatures: Formal Definitions, Simplified Requirements, and a Construction Based on General Assumptions", [online], "Advances in Cryptology—EUROCRYPT 2003", [searched on Jan. 11, 2018 (Heisei 30)], the Internet, (URL: https://cseweb.ucsd.edu/~mihir/papers/gs.pdf), Springer Berlin Heidelberg). The group signature generated by signature generator 1013, that is the one of the first electronic signature and the second electronic signature is generated using the signature generating key for the individual user, that is, one of the signature generation key for the first user and the signature generation key for the second user. Based on the one of the first electronic signature and the second electronic signature generated by signature generator 1013, it is possible to determine that the corresponding one of the first user and the second user is a member belong to the certain group, but it is impossible to identify which user was generated the one of the first electronic signature and the second electronic signature. This is a feature of the group signature.

<Control Unit 1014>

When control unit 1014 received an electric power transaction agreement notification indicating that an electric power transaction was agreed upon from authentication server 200a, etc., control unit 1014 transmits an instruction to one of solar photovoltaic power generation equipment 102 and accumulator battery 103, based on the electric power transaction agreement notification. For example, when performing control for causing transmission of electric power, control unit 1014 transmits, to solar photovoltaic power generation equipment 102 and accumulator battery 103, an electric power transmission instruction indicating that one of the electric power generated by solar photovoltaic power generation equipment 102 and the electric power accumulated in accumulator battery 103 should be transmitted to electric power network 500. When performing control for causing use of electric power, control unit 1014 transmits an electric power reception instruction indicating that electric power should be accumulated in accumulator battery 103, by using electric power from electric power network 500.

Control unit 1014 may control a display included in or connected to controller 101 so as to cause the display to display one of the electric power selling request information, the electric power buying request information, or the like transmitted to authentication server 200*a*. When a consensus that the validity of the first transaction data is verified was reached ("validity" here means being valid) by a plurality of authentication servers and a block including the first transaction data is recoded in each of the distributed ledgers of the respective authentication servers, control unit 1014 may cause the display to display electric power selling registration information which includes electric power selling amount information and a first time stamp and indicates a selling request from the first electric power equipment. Control unit 1014 may cause the display to display electric power selling registration information also until the consensus that the validity of the first transaction data is verified was reached by the plurality of authentication servers.

For example, when no consensus that the validity of the first transaction data is verified was reached by the plurality of authentication servers, control unit 1014 may cause the display to display failure information indicating the fact.

<Storage 1015>

Storage 1015 records the transaction data generated by transaction data generator 1012. In this embodiment, storage 1015 records: one of the first transaction data and the second transaction data generated by transaction data generator 1012 generated by transaction data generator 1012; or one of the fourth transaction data and the fifth transaction data generated by transaction data generator 1012.

<Communication Unit 1016>

Communication unit 1016 may perform communication with service server 300, authentication server 200*a*, etc. via communication network 400. This communication may be made according to transport layer security (TLS) In this case, an encryption key for TLS communication may be held in communication unit 1016.

In this embodiment, communication unit 1016 transmits one of the first transaction data and the second transaction data to a first server included in the plurality of authentication servers via communication network 400. Communication unit 1016 transmits the one of the fourth transaction data and the fifth transaction data to the first authentication server which is at least one server included in the plurality of authentication servers via communication network 400.

Next, authentication server 200*a*, etc. is described.

[1.4 A Configuration of Authentication Server 200*a*]

Figure 6:
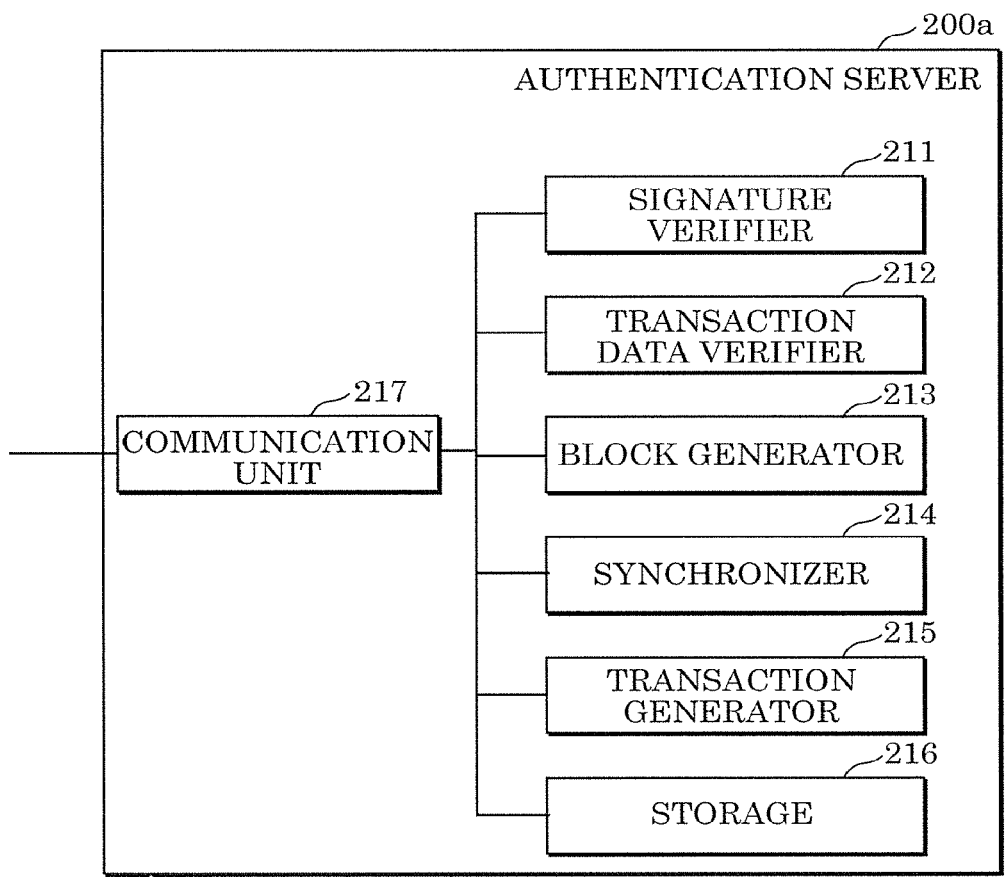
FIG. 6 is a block diagram illustrating a functional configuration of an authentication server according to the embodiment.

FIG. 6 is a block diagram indicating a functional configuration of authentication server 200*a* according to this embodiment. Authentication servers 200*b* and 200*c* have the same configuration, and thus authentication server 200*a* is taken as an example in the following description.

As illustrated in FIG. 6, authentication server 200*a* includes: signature verifier 211; transaction data verifier 212; block generator 213; synchronizer 214; transaction generator 215; storage 216; and communication unit 217. Authentication server 200*a* can be implemented by means of a processor executing a predetermined program using a memory. Hereinafter, each of the constituent elements is described.

<Signature Verifier 211>

When receiving the first transaction data, signature verifier 211 verifies whether the first electronic signature included in the received first transaction data is valid. When receiving the second transaction data, signature verifier 211 verifies whether the second electronic signature included in the received second transaction data is valid. Likewise, when receiving the fourth transaction data, signature verifier 211 verifies whether the first electronic signature included in the received fourth transaction data is valid. When receiving the fifth transaction data, signature verifier 211 verifies whether the second electronic signature included in the received fifth transaction data is valid. Here, signature verifier 211 holds a public key which is the group signature verifying key distributed by service server 300. Signature verifier 211 verifies whether one of the first electronic signature and the second electronic signature is valid using the held public key.

In this way, signature verifier 211 verifies whether the one of the first electronic signature and the second electronic signature which is the group signature of the received transaction data is valid. Signature verifier 211 receives the group signature verifying key from service server 300 and holds the group signature verifying key in advance.

When signature verifier 211 verified that the group signature, that is, the one of the first electronic signature and the second electronic signature is valid, signature verifier 211 notifies transaction data verifier 212 of the fact.

In the verification of the group signature, the signature verifying key is commonly used in a service. The use of the signature verifying key allows signature verifier 211 to verify that the first electronic signature was generated using one of the signature generating keys registered in service server 300, but does not allow signature verifier 211 to identify which one of the signature generating keys was used to generate the first electronic signature. In other words, authentication server 200*a* is capable of identifying that the received transaction data was of a home associated with a blockchain address used in the service, based on the blockchain address. However, authentication server 200*a* is incapable of identifying the home that generated the transaction data because authentication server 200*a* is incapable of identifying any home based on a blockchain address. This is the feature of the group signature.

<Transaction Data Verifier 212>

When transaction data verifier 212 received the first transaction data, transaction data verifier 212 verifies the validity of the received first transaction data. When transaction data verifier 212 received the second transaction data, transaction data verifier 212 verifies the validity of the received second transaction data. When transaction data verifier 212 received one of the fourth transaction data and fifth transaction data, transaction data verifier 212 verifies the validity of the received one of the transaction data.

In this way, transaction data verifier 212 verifies the validity of the transaction data received from home 100*a*, etc. More specifically, when transaction data verifier 212 received the transaction data from home 100*a*, etc., transaction data verifier 212 verifies whether (i) the blockchain address, and (ii) one of electric power selling request information, electric power buying request information, and electric power information which are included in the transaction data are correct. When transaction data verifier 212 verified that the transaction data was valid transaction data and receives a notification regarding the validity of the signature from signature verifier 211, transaction data verifier 212 records the transaction data onto storage 216.

Transaction data verifier 212 verifies whether electric power was appropriately transmitted or used with reference to the transaction data indicating the result of electric power transaction recorded onto storage 216, as verification of whether the electric power information is valid. When transaction data verifier 212 verifies the validity of the transaction data, transaction data verifier 212 notifies the transaction data to synchronizer 214.

<Block Generator 213>

When the first electronic signature and the first transaction data are verified successfully, block generator 213 executes a first consensus algorithm for reaching a consensus that the validity of the first transaction data is verified, together with the other authentication servers 200b and 200c which are a plurality of second servers different from the first server. When the second electronic signature and the validity of the second transaction data are verified successfully, block generator 213 executes a second consensus algorithm for reaching a consensus that the validity of the second transaction data is verified, together with the other authentication servers 200b and 200c. When the first electronic signature and the validity of the fourth transaction data are verified successfully, block generator 213 executes a fourth consensus algorithm for reaching a consensus that the validity of the fourth transaction data is verified, together with the other authentication servers 200b and 200c. When the second electronic signature and the fifth transaction data are verified successfully, block generator 213 executes a fifth consensus algorithm for reaching a consensus that the validity of the fifth transaction data is verified, together with the other authentication servers 200b and 200c. When third transaction data to be described later is transferred to the other authentication servers 200b and 200c, block generator 213 may execute a third consensus algorithm for reaching a consensus that the validity of the third transaction data is verified, together with the other authentication servers 200b and 200c.

In this way, block generator 213 executes a consensus algorithms between the plurality of authentication servers. Each of the consensus algorithm may be a consensus algorithm what is called practical byzantine fault tolerance (PBFT), or any other consensus algorithm which has been known publicly. When PBFT is used, it is to be noted that block generator 213 receives a report indicating whether or not the validity of the transaction is verified successfully from each of the other authentication servers 200b and 200c, and determines whether or not the number of reports exceeds a predetermined number. When the number of reports exceeds the predetermined number, block generator 213 may determine that consensus that the validity of the transaction data is verified was reached by the consensus algorithm.

When the consensus that the validity of the transaction data is verified was reached by the consensus algorithm, block generator 213 records the block including the transaction data in the distributed ledger of storage device 201a of authentication server 200a. The consensus algorithms mean the first consensus algorithm to the fifth consensus algorithm, and the transaction data means the first transaction data to the fifth transaction data.

In this way, in this embodiment, block generator 213 executes the consensus algorithms between authentication servers 200a, 200b, and 200c. In other words, block generator 213 firstly generates a block of a blockchain including at least one transaction data item. Next, block generator 213 executes the consensus algorithm. When a consensus on the execution of the consensus algorithm was reached, block generator 213 records the generated block onto storage 216. The block generated by block generator 213 is recorded in storage 216 by being connected to the blockchain stored therein.

Here, a data structure of the blockchain and a data structure of the transaction data are described.

Figure 7A:
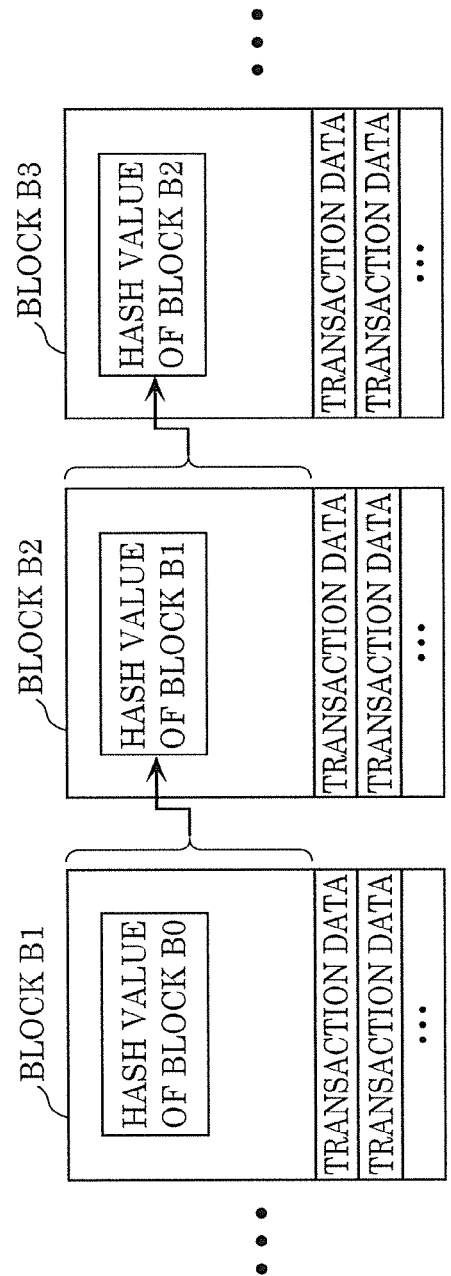
FIG. 7A is a diagram illustrating a data structure of a blockchain.

FIG. 7A is a diagram illustrating the data structure of the blockchain.

The blockchain is a chain of blocks as units of recording connected to each other. Each of the blocks includes a plurality of transaction data entries and a hash value of the immediately-preceding block. More specifically, block B2 includes the hash value of immediately-preceding block B1. The hash value calculated from the plurality of transaction data entries included in block B2 and the hash value of block B1 is included in block B3 as the hash value of block B2. By including the content of the previous blocks as the hash values and connecting the blocks to form the chain, manipulation of the transaction data of the connected blocks are effectively avoided.

Supposing that the past transaction data of a block in the chain is modified, the hash value of the block becomes a value different from the value before the modification. Thus, in order to pretend that the manipulated block is correct, all the succeeding blocks need to be regenerated, and such work is actually extremely difficult.

In this embodiment, respective transaction data indicate: first transaction data indicating an electric power selling request; second transaction data indicating an electric power buying request; and third transaction data indicating the result of matching between selling and buying requests for the electric power transaction. Other respective transaction data indicate: fourth transaction data indicating the result of electric power selling transaction; and fifth transaction data indicating the result of electric power buying transaction.

Figure 7B:
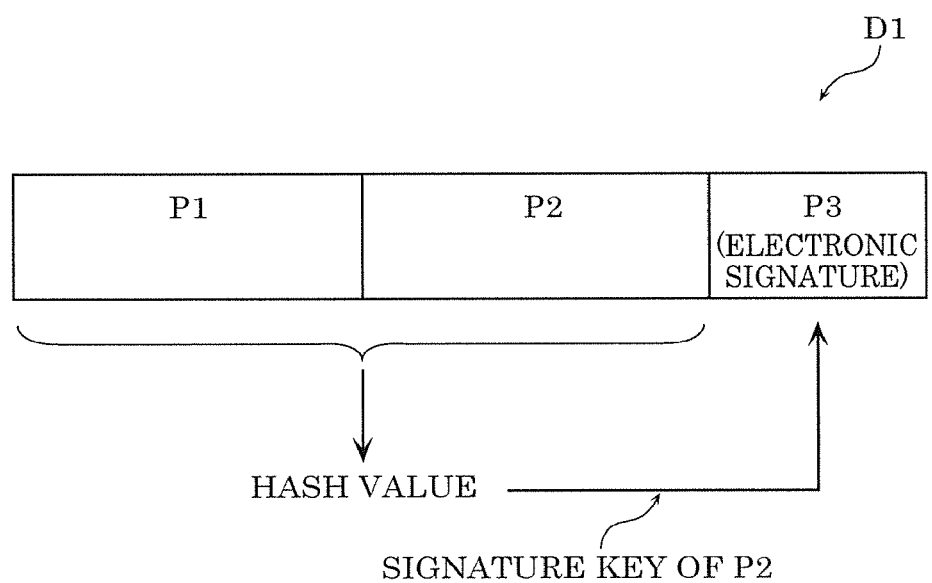
FIG. 7B is a diagram illustrating a data structure of transaction data.

FIG. 7B is a diagram illustrating the data structure of the transaction data.

Transaction data D1 illustrated in FIG. 7B are examples of first transaction data to fifth transaction data. Transaction data D1 includes: address P1 indicating an owner; address P2 indicating a provider; and electronic signature P3 generated by providing a signature on the hash values of addresses P1 and P1 using a signature key of the owner. It is to be noted that address P1 of transaction data is vacant when the transaction data is newly generated.

<Synchronizer 214>

Synchronizer 214 synchronizes blocks of a blockchain or transaction data between a plurality of authentication servers (authentication servers 200a to 200c).

More specifically, when the validity of the transaction data obtained from home 100a is verified by transaction data verifier 212, synchronizer 214 transfers a copy of the transaction data to the other authentication servers 200b and 200c. The plurality of authentication servers synchronize the transaction data of the blockchain in a peer to peer manner. Synchronizer 214 records the synchronized transaction data of the blockchain onto storage 216.

For example, when synchronizer 214 received first transaction data indicating an electric power selling request or second transaction data indicating an electric power buying request and confirmed the validity of the second transaction data, synchronizer 214 transfers the first or second transaction data to the other authentication servers 200b and 200c, and records the verified transaction data onto storage 216. When synchronizer 214 received the transaction data from the other authentication servers 200b and 200c, synchronizer 214 records the transaction data onto storage 216.

<Transaction Generator 215>

Transaction generator 215 searches for matching electric power selling and buying requests for an electric power transaction by comparing (i) electric power selling amount information and a first time stamp and (ii) electric power buying amount information and a second time stamp recorded in the distributed ledger of storage device 201a. When matching electric power selling and buying requests for an electric power transaction are searched out successfully, transaction generator 215 generates third transaction data including: a first blockchain address indicating the electric power seller and a second blockchain address indicating the electric power buyer in the agreed electric power transaction; and the amount of electric power to be sold and bought in the electric power transaction. When the electric power transaction was agreed upon, transaction generator 215 may notify the fact to the first electric power equipment and the second electric power equipment.

In this embodiment, transaction generator 215 performs the matching between the electric power selling and buying requests for the electric power transaction with reference to an electric power selling list composed of the plurality of electric power selling requests and an electric power selling list composed of the plurality of electric power buying requests recorded in storage 216. When the matching electric power selling and buying requests for the electric power transaction are searched out successfully, transaction generator 215 generates third transaction data indicating the result of matching selling and buying requests in the electric power transaction, and records the transaction data to storage 216.

FIG. 8A is a diagram illustrating an electric power selling list according to the embodiment. FIG. 8B is a diagram illustrating an electric power buying list according to the embodiment. As illustrated in FIG. 8A, the electric power selling list is configured to include the following for each row: a blockchain address; date on which electric power can be sold; the amount of electric power which can be sold on the date (electric power selling amount); unit price for selling electric power; and a group signature. In this way, each row of the electric power selling list includes: a first blockchain address; a first time stamp indicating a first date on which electric power can be sold; and a first electronic signature which is associated with the first user. In addition, as illustrated in FIG. 8B, the electric power buying list is configured to include the following for each row: a blockchain address; date on which electric power can be bought; the amount of electric power which can be bought on the date (electric power buying amount); unit price for buying electric power; and a group signature. In this way, each row of the electric power buying list includes: a second blockchain address; a second time stamp indicating a second date on which electric power can be sold; and a second electronic signature which is associated with the second user.

Transaction generator 215 performs matching between electric power selling and buying requests with reference to the date on which electric power can be sold and the amount of electric power which can be sold on the date in the electric power selling list as illustrated in FIG. 8A and the date on which electric power can be bought and the amount of electric power which can be bought on the date in the electric power buying list as illustrated in FIG. 8B. For example, FIG. 8A includes a record that the electric power seller having the blockchain address of "0x03547921" has a request for selling electric power the amount of which is "20 kWh" at the unit price of "20 Yen" at and from time "13:00" on the date "Dec. 15, 2017". FIG. 8B includes a record that the electric power buyer having the blockchain address "0x04587463" has a request for buying electric power the amount of which is "10 kWh" at the unit price of "20 Yen" at and from time "13:30" on the date "Dec. 15, 2017". Based on these records, transaction generator 215 determines that an electric power transaction was agreed upon between the electric power seller having the blockchain address "0x03547921" and the electric power buyer having the blockchain address of "0x04587463" on conditions that the electric power the amount of which is "10 kWh" is sold and bought at the unit price of "20 Yen" at and from time "13:30" on the date "Dec. 15, 2017". When the electric power transaction was agreed upon, transaction generator 215 generates transaction data indicating, as the result of matching between selling and buying requests for the electric power transaction, the blockchain address of the electric power seller and the blockchain address of the electric power buyer, the date of transaction, the amount of electric power sold and bought, and the unit price, and records the transaction data to storage 216.

FIG. 8C is a diagram indicating an example of an electric power transaction list indicating the result of matching between selling and buying requests for the electric power transaction, performed by transaction generator 215 according to this embodiment. The electric power transaction list illustrated in FIG. 8C indicates: an electric power seller address which is the blockchain address of the electric power seller; an electric power buyer address which is the blockchain address of the electric power buyer; date of transaction, the amount of electric power sold and bought, and a unit price. The electric power transaction list includes a signature of authentication server 200a, but it is to be noted that the signature is not illustrated in FIG. 8C. In this way, each row of the electric power transaction list includes: a first blockchain address indicating the electric power seller and a second blockchain address indicating the electric power buyer in the agreed electric power transaction; and the amount of electric power to be sold and bought in the electric power transaction.

Transaction generator 215 generates transaction data indicating, as the result of matching between selling and buying requests for the electric power transaction, the information indicated in the row of the electric power transaction list in FIG. 8C, and records the transaction data onto storage 216. After generating the transaction data indicating the result of matching between selling and buying requests for the electric power transaction, transaction generator 215 notifies the details of the matching result to home 100a, etc. which performs the electric power transaction. Transaction generator 215 may periodically broadcast the matching result. When the home which performs the electric power transaction can be identified based on the blockchain address, transaction generator 215 may notify the blockchain address to each of the homes.

<Storage 216>

Storage 216 records the transaction data of the blockchain onto storage device 201a in units of blocks. Storage device 201a may be configured inside storage 216, or as illustrated in FIG. 1, outside authentication server 200a. The transaction data includes: the first transaction data indicating the electric power selling request; the second transaction data indicating the electric power buying request; and the third transaction data indicating the result of matching between selling and buying requests for the electric power transaction. Other respective transaction data indicate: fourth transaction data indicating the result of electric power selling transaction; and fifth transaction data indicating the result of electric power buying transaction.

<Communication Unit 217>

Communication unit 217 communicates with two or more homes 100a, etc., the other authentication servers 200b and 200c, and service server 300. More specifically, communication unit 217 is a communication interface which communicates with the two or more homes 100a, etc., the other authentication servers 200b and 200c, and service server 300. Communication with the two or more homes 100a, etc. and service server 300 may be performed according to TLS.

In this case, an encryption key for TLS communication may be held in communication unit 217.

Next, service server 300 is described.

[1.5 A Configuration of Service Server 300]

Figure 9:
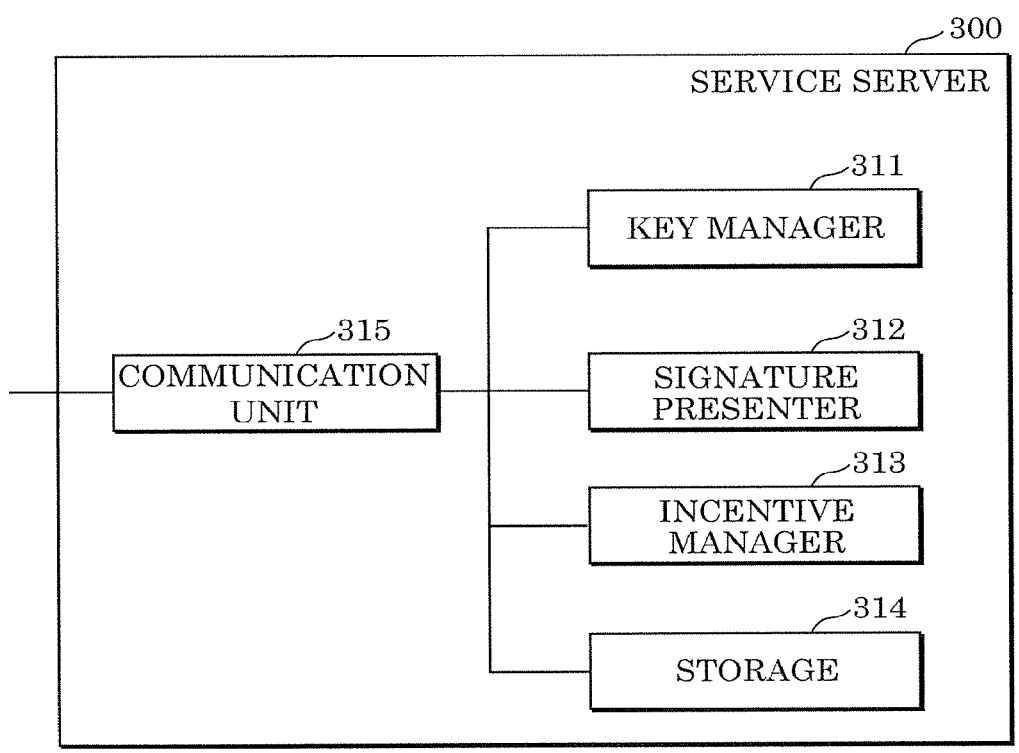
FIG. 9 is a block diagram illustrating a functional configuration of a service server according to the embodiment.

FIG. 9 is a block diagram indicating a functional configuration of service server 300 according to this embodiment.

As illustrated in FIG. 9, service server 300 includes: key manager 311; signature presenter 312; incentive manager 313; storage 314; and communication unit 315. Service server 300 can be implemented by means of a processor executing a predetermined program using a memory. Hereinafter, each of the constituent elements is described.

<Key Manager 311>

Key manager 311 generates a group signature key based on application by a user in home 100a, etc. registered in the service, and manages the group signature key. For example, key manager 311 generates a group signature key assigned to a group to which the first user and the second user belong. In this embodiment, key manager 311 generates a secret key for providing a group signature to be used to generate a first electronic signature, and transmits the secret key to the first electric power equipment. Key manager 311 generates a secret key for providing a group signature to be used to generate a second electronic signature, and transmits the secret key to the second electric power equipment. Key manager 311 distributes a public key which is a signature verifying key for the group signature to a plurality of authentication servers. Key manager 311 generates a signature presenting key for the group signature, and records the signature presenting key to storage 314.

More specifically, key manager 311 generates a key for the group signature assigned to the first group to which a plurality of users including the first user belong, and generates a key for the group signature assigned to the second group to which a plurality of users including the second user belong.

Key manager 311 generates a secret key for providing the group signature used to generate the first electronic signature, transmits the secret key to the first electric power equipment, and distributes, to the plurality of authentication servers, the public key which is the signature verifying key for the group signature assigned to the first group. Key manager 311 generates a secret key for providing the group signature used to generate the second electronic signature, transmits the secret key to the second electric power equipment, and distributes, to the plurality of authentication servers, the public key which is the signature verifying key for the group signature assigned to the second group.

In other words, key manager 311 transmits the resulting signature generating key for the group signature to the user in home 100a, or the like. Key manager 311 transmits the resulting signature verifying key for the group signature to authentication server 200a, etc. Key manager 311 records the resulting signature presenting key to storage 314.

<Signature Presenter 312>

Signature presenter 312 obtains transaction data with reference to the distributed ledger of one of the authentication servers. Signature presenter 312 presents the group signature including the obtained transaction data, and identify the user who provided the group signature.

In this embodiment, signature presenter 312 transmits a request for referring to transaction data indicating the result of electric power selling transaction to authentication server 200a, etc., and receives the content of the distributed ledger of the block, etc. including the transaction data. Signature presenter 312 presents the group signature including the received transaction data, and identifies the user who sold the electric power. In view of the features of the group signature, this processing can be performed only by service server 300. Signature presenter 312 notifies user information indicating the identified user to incentive manager 313.

<Incentive Manager 313>

After an incentive is paid to the identified user, incentive manager 313 notifies that the incentive was paid.

In this embodiment, when incentive manager 313 received user information from signature presenter 312, incentive manager 313 notifies the incentive to the identified user. The incentive may be paid by electronic funds transfer, by electric power transaction points, or virtual coins using the blockchain. The incentive may be paid as a reduction in price at the time of another electric power transaction or a product purchase. When the incentive is paid by virtual coins, incentive manager 313 may pay the incentive without causing signature presenter 312 to present the user information, that is, the group signature.

<Storage 314>

Storage 314 records the signature generating key, the signature verifying key, and the signature presenting key generated by key manager 311.

<Communication Unit 315>

Communication unit 315 communicates with two or more homes 100a, etc., and authentication servers 200a, 200b, and 200c. More specifically, communication unit 315 is a communication interface which communicates with the two or more homes 100a, etc., and authentication servers 200a, 200b, and 200c. The two or more homes 100a, etc., and authentication servers 200a, 200b, and 200c may communicate with each other according to TLS. In this case, an encryption key for TLS communication may be held in communication unit 315.

[1.6 Registration Processing Performed Between the Service Server and the Homes]

Next, a description is given of the registration processing performed between service sever 300, home 100a, etc., and authentication sever 200a, etc. Here, a description is given of an example in which the user in each home applies for a service to service server 300 using controller 101 present in home 100a, etc.

Figure 10:
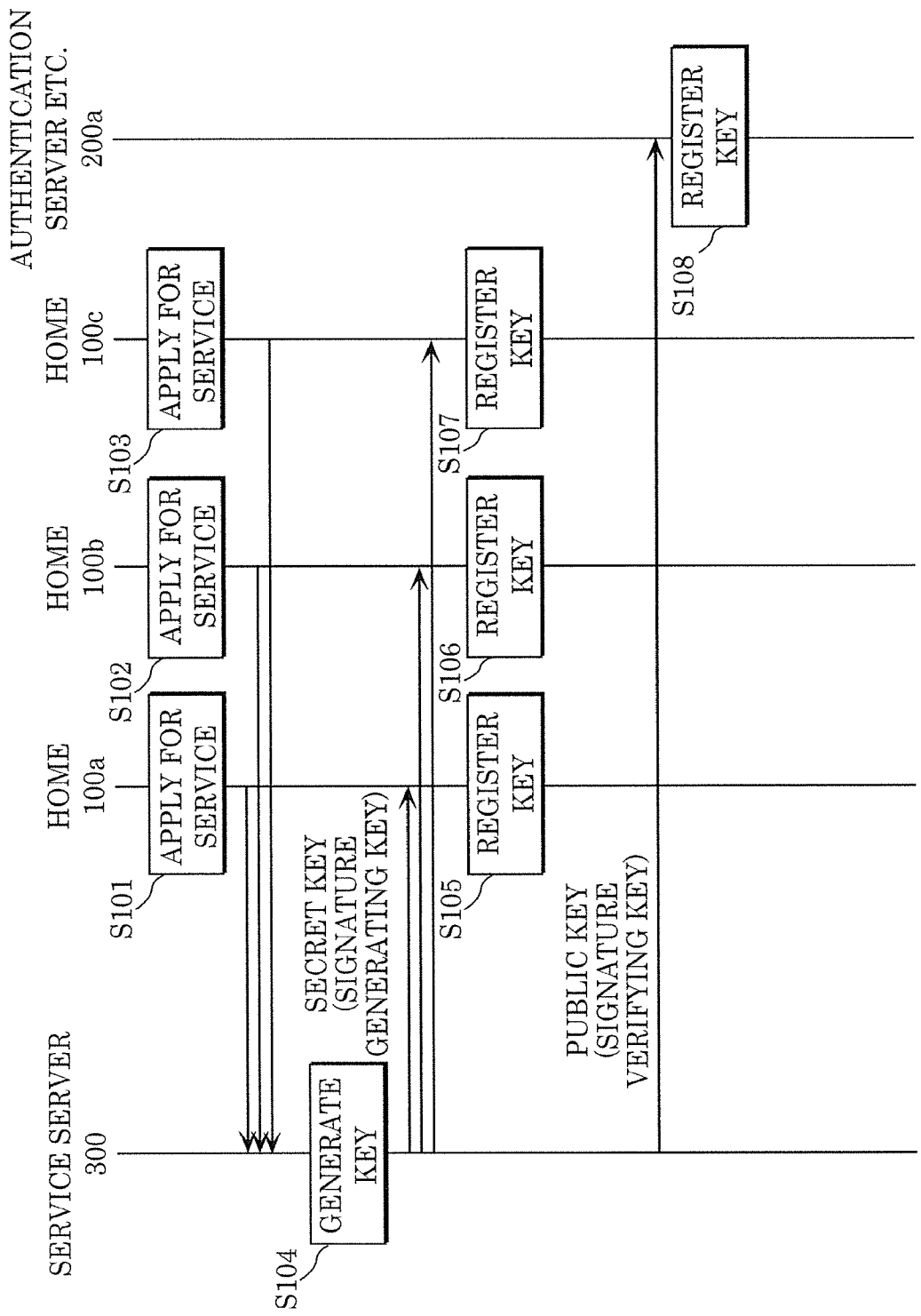
FIG. 10 is a sequence diagram illustrating service registration processing performed between a service server, homes, and authentication servers according to the embodiment.

FIG. 10 is a sequence diagram indicating the registration processing for the service between service server 300, home 100a, etc., and authentication server 200a, etc. according to this embodiment.

First, in Step S101, the user of home 100a transmits application information which is information for applying the electric power transaction service to service server 300. Likewise, in Step S102, the user of home 100b transmits the application information to service server 300. In Step S103, the user of home 100c transmits the application information to service server 300. In this way, the user of each home applies for the service by transmitting the application information for the service from the home to service server 300.

Next, in Step S104, upon receiving the application information from each home, service server 300 generates a group signature key based on the application information. More specifically, service server 300 generates a signature generating key for an individual user that is a secret key for providing the group signature based on the application information, and transmits the signature generating key to each home. Service server 300 generates a signature presenting key based on the application information, and holds the signature presenting key. Service server 300 generates a public key which is a group signature verifying key based on the application information, and transmits the signature verifying key for the group signature to authentication server 200a, etc.

Next, in Step S105, the user in home 100a receives the signature generating key for the individual user from service server 300, and registers the signature generating key. Likewise, in Step S106, the user in home 100b receives the signature generating key for the individual user from service server 300, and registers the signature generating key. In Step S107, the user in home 100c receives the signature generating key for the individual user from service server 300, and registers the signature generating key. In this way, each home receives the secret key for the group signature from service server 300, and registers the secret key.

Next, in Step S108, authentication server 200a, etc. receives the public key which is the signature verifying key for the group signature from service server 300, and registers the public key.

[1.7 An Overall Electric Power Transaction Sequence Between the Homes and the Authentication Servers]

Figure 11:
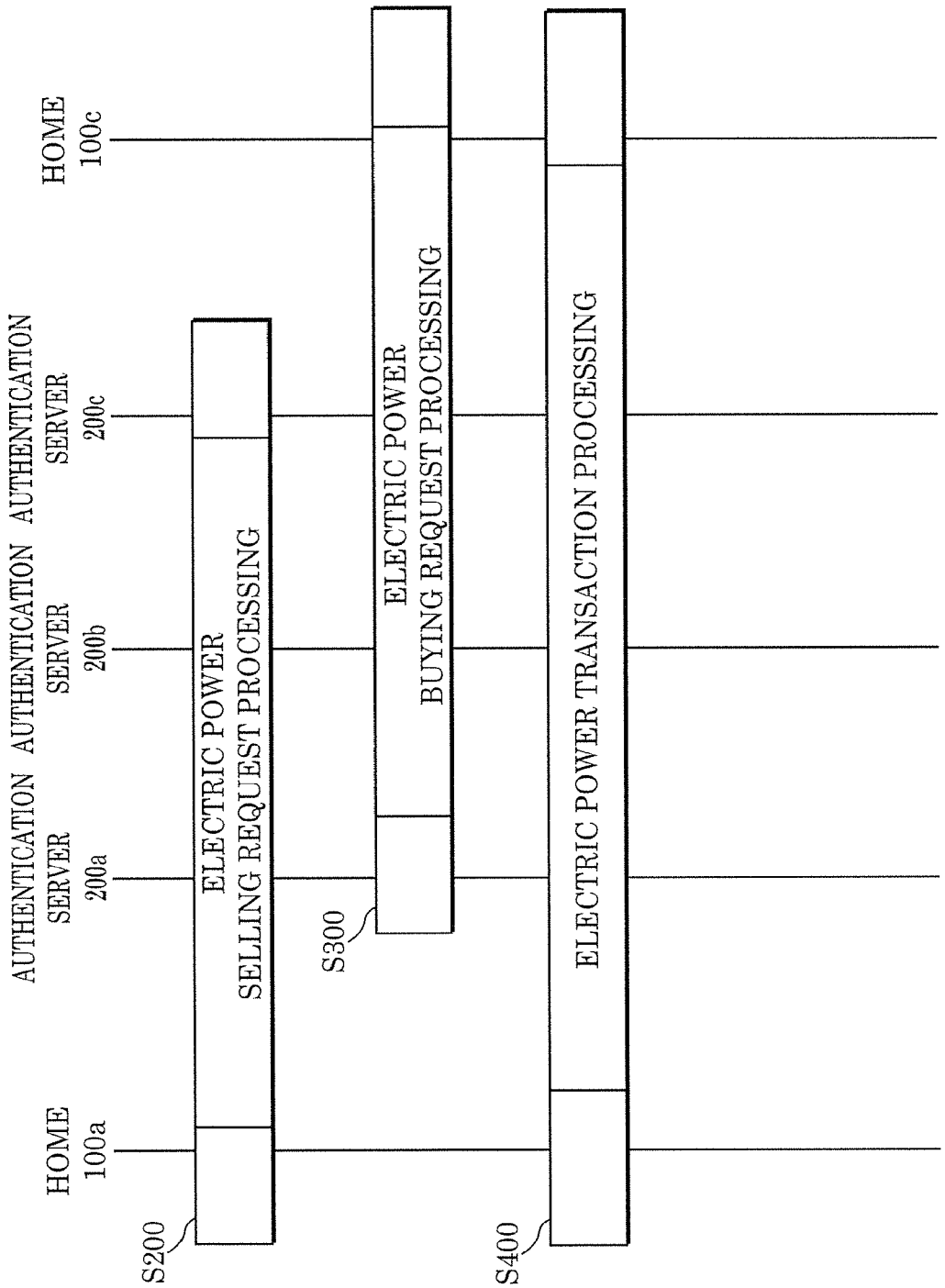
FIG. 11 is a diagram illustrating an overall sequence of electric power transaction between two homes included in the homes and the authentication servers according to the embodiment.

Next, a description is given of an electric power transaction sequence between home 100a, etc. and authentication server 200a, etc. FIG. 11 is a diagram of the overall electric power transaction sequence between home 100a, etc. and authentication server 200a, etc. according to the embodiment. Each of the processes are described below.

First, in Step S200, for example, electric power selling request processing is performed between, for example, home 100a and authentication servers 200a, 200b, and 200c.

First, in Step S300, for example, electric power buying request processing is performed between, for example, home 100c and authentication servers 200a, 220b, and 200c.

Next, in Step S400, when matching electric power selling and buying requests for an electric power transaction are searched out successfully in any one of authentication servers 200a, 200b, and 200c, the electric power transaction processing based on the agreed electric power transaction is performed.

It is to be noted that any one of the electric power selling request processing in Step S200 and the electric power buying request processing in Step S300 may be executed earlier than the other, or may be executed non-periodically. In addition, the electric power transaction processing in Step S400 may be executed every time the electric power selling request processing in Step S200 or the electric power buying request processing in Step S300 is executed, or may be executed periodically.

[1.7.1 Electric Power Selling Request Processing Performed Between the Homes and the Authentication Servers]

Figure 12:
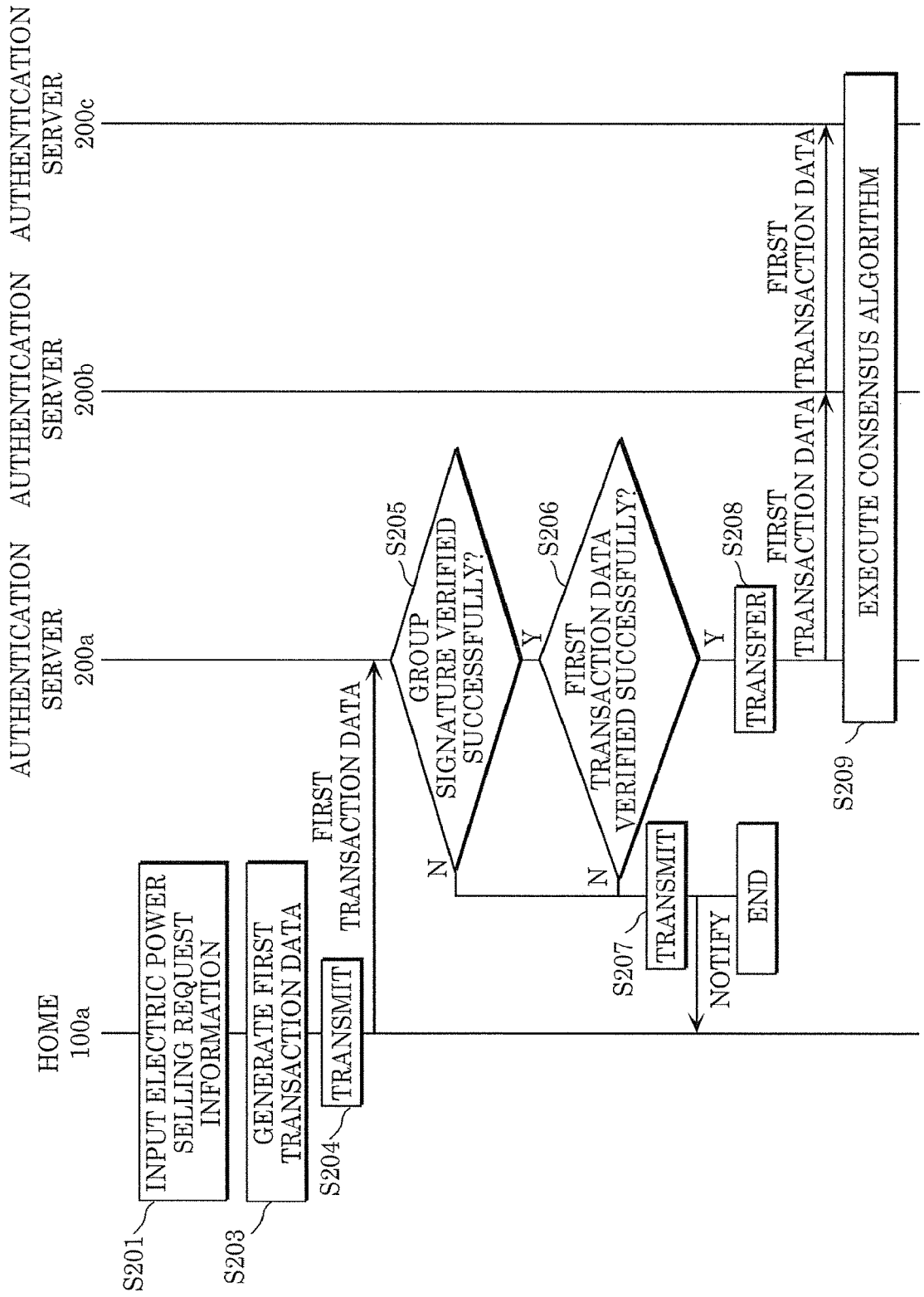
FIG. 12 is a sequence diagram of an electric power selling request information between one of the two homes and the authentication servers according to the embodiment.

Next, a description is given of electric power selling request between home 100a, etc. and authentication server 200a, etc. FIG. 12 is a sequence diagram of electric power selling request processing performed between home 100a, etc. and authentication server 200a, etc. according to this embodiment. FIG. 12 illustrates a non-limiting example in which home 100a sells electric power. A similar sequence of electric power selling request processing is obtained also in the case of another possible home such as home 100b.

First, in Step S201, one of controller 101 or the user in home 100a inputs electric power selling request information when requesting for selling electric power. For example, such an electric power selling request is made when no electric power is to be used in home 100a because the user in home 100a goes out. As another example, such an electric power selling request is made when there is a surplus of electric power generated by solar photovoltaic power generation equipment 102, or it is likely that a surplus of electric power is to be generated by solar photovoltaic power generation equipment 102.

Next, in Step S203, controller 101 of home 100a generates transaction data indicating an electric power selling request (hereinafter, referred to as first transaction data), based on the input electric power selling request information. As described above, the first transaction data is composed of: the first blockchain address; the date; the electric power selling amount; the unit price; and the group signature.

Next, in Step S204, controller 101 of home 100a transmits the generated first transaction data to authentication server 200a. Although controller 101 of home 100a transmits the generated first transaction data to authentication server 200a in the example illustrated in FIG. 12, it is to be noted that controller 101 may transmit the generated first transaction data to the other authentication servers 200b and 200c. The generated first transaction data may be transmitted to the other authentication servers 200b and 200c, and in such a case a similar sequence of electric power selling request processing in Steps 205 to S208 is performed thereby.

Next, in Step S205, authentication server 200a verifies whether the group signature of the first transaction data received from home 100a is valid.

When the group signature of the first transaction data is verified successfully in Step S205 (Y in S205), authentication server 200a verifies the validity of the first transaction data received from home 100a (S206).

When the validity of the first transaction data is verified successfully in Step S206 (Y in S206), authentication server 200a transfers the first transaction data to the other authentication servers 200b and 200c (S208). The other authentication servers 200b and 200c also verify the received first transaction data in the same manner.

When the group signature of the first transaction data is not verified successfully in Step S205 (N in S205), authentication server 200a transmits a notification indicating the fact to home 100a (S207), and ends the processing. Likewise, when the validity of the first transaction data is not verified successfully in Step S206 (N in S206), authentication server 200a transmits a notification indicating the fact to home 100a (S207), and ends the processing. Step S205 and Step S206 do not always need to be performed in the order illustrated in FIG. 12, and may be performed in the inverse order.

Next, in Step S209, authentication servers 200a, 200b, and 200c execute a consensus algorithm. When authentication servers 200a, 200b, and 200c verify that the first transaction data is valid transaction data (that is, verify the validity), each of authentication servers 200a, 200b, and 200c generates a block including the first transaction data. Each of authentication servers 200a, 200b, and 200c record the block including the first transaction data to a corresponding one of the distributed ledgers of storage devices 201a, 201b, and 201c.

[1.7.2 Electric Power Buying Request Processing Performed Between the Homes and the Authentication Servers]

Figure 13:
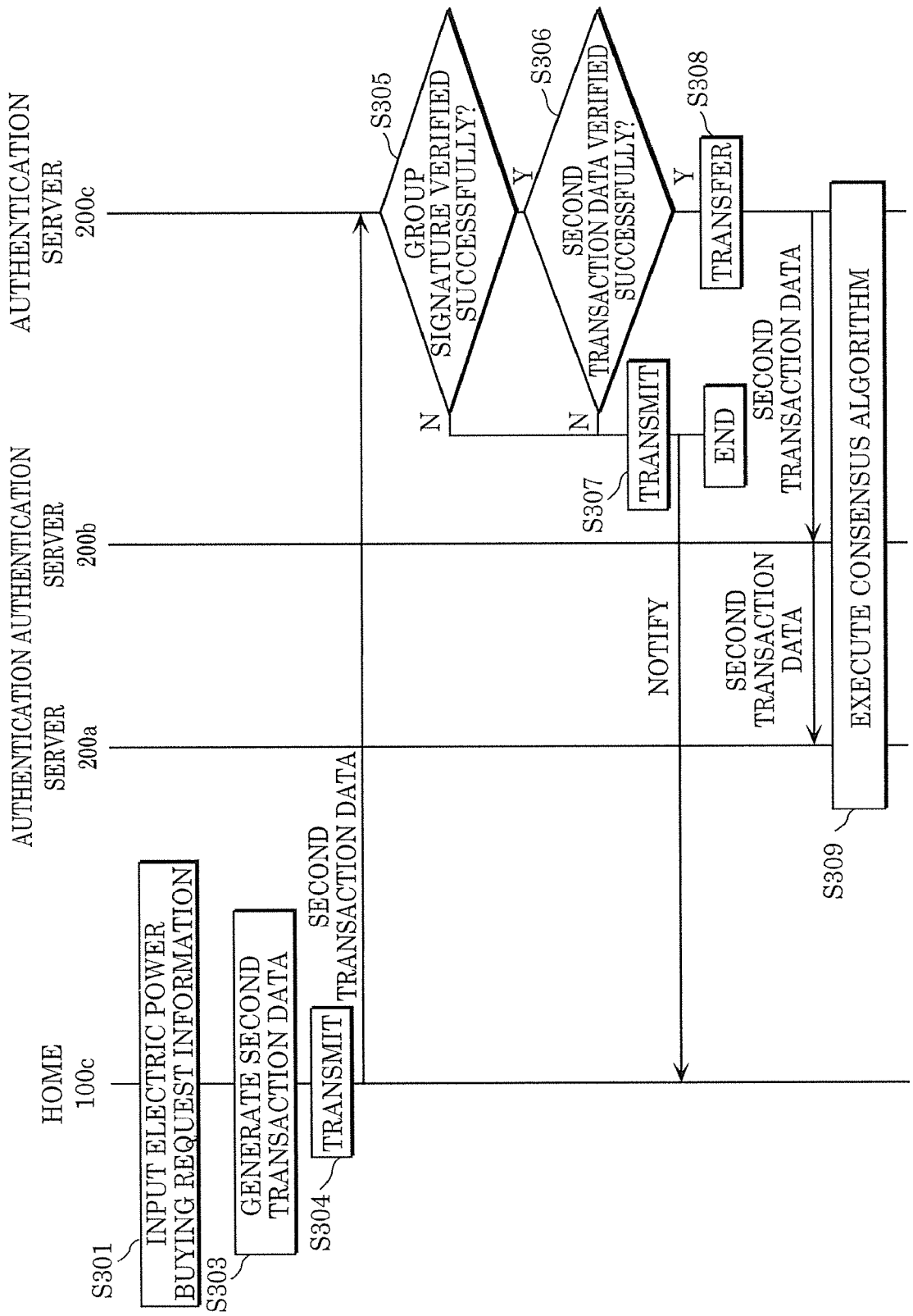
FIG. 13 is a sequence diagram of an electric power buying request information between another one of the two homes and the authentication servers according to the embodiment.

Next, a description is given of electric power buying request processing performed between home 100a, etc. and authentication server 200a, etc. FIG. 13 is a sequence diagram of electric power buying request processing performed between home 100a, etc. and authentication server 200a, etc. according to this embodiment. FIG. 13 illustrates a non-limiting example in which home 100c sells electric power. A similar sequence of electric power selling request processing is obtained in the case of another possible home such as home 100b.

First, in Step S301, one of controller 101 or the user in home 100c inputs electric power buying request information when requesting for buying electric power. For example, in home 100c, such an electric power selling request is made when the amount of electric power accumulated in accumulator battery 103 is small and a large amount of electric power is to be used. For example, an electric power buying request may be made in home 100c when surplus electric power from the other home 100a, or the like can be available at cost lower than the cost for purchasing electric power from an electric power company.

Next, in Step S303, controller 101 of home 100c generates transaction data indicating an electric power buying request (hereinafter, referred to as second transaction data), based on the input electric power buying request information. As described above, the second transaction data is composed of: the second blockchain address; the date; the electric power selling amount; the unit price; and the group signature.

Next, in Step S304, controller 101 of home 100c transmits the generated second transaction data to authentication server 200c. Although controller 101 of home 100c transmits the generated second transaction data to authentication server 200c in the example illustrated in FIG. 13, it is to be noted that controller 101 may transmit the generated second transaction data to the other authentication server 200a and 200b. The generated second transaction data may be transmitted to the other authentication servers 200b and 200c, and in such a case a similar sequence of electric power selling request processing in Steps 305 to S308 is performed thereby.

Next, in Step S305, authentication server 200c verifies whether the group signature of the second transaction data received from home 100c is valid.

When the group signature of the second transaction data is verified successfully in Step S305 (Y in S305), authentication server 200c verifies the validity of the second transaction data received from home 100c (S306).

When the validity of the second transaction data is verified successfully in Step S306 (Y in S306), authentication server 200c transfers the second transaction data to the other authentication servers 200a and 200b (S308). The other authentication servers 200a and 200b also verify whether the received second transaction data is valid in the same manner.

When the group signature of the second transaction data is not verified successfully in Step S305 (N in S305), authentication server 200c transmits a notification indicating the fact to home 100c (S307), and ends the processing. Likewise, when the validity of the second transaction data is not verified successfully in Step S306 (N in S306), authentication server 200c transmits a notification indicating the fact to home 100c (S307), and ends the processing. Step S305 and Step S306 do not always need to be performed in the order illustrated in FIG. 13, and may be performed inversely.

Next, in Step S309, authentication servers 200a, 200b, and 200c execute a consensus algorithm. When authentication servers 200a, 200b, and 200c verify that the second transaction data is valid transaction data (that is, verify the validity), each of authentication servers 200a, 200b, and 200c generates a block including the second transaction data. Each of authentication servers 200a, 200b, and 200c records the block including the second transaction data to a corresponding one of the distributed ledgers of storage devices 201a, 201b, and 201c.

[1.7.3 Electric Power Transaction Processing Performed Between the Homes and the Authentication Servers]

Figure 14:
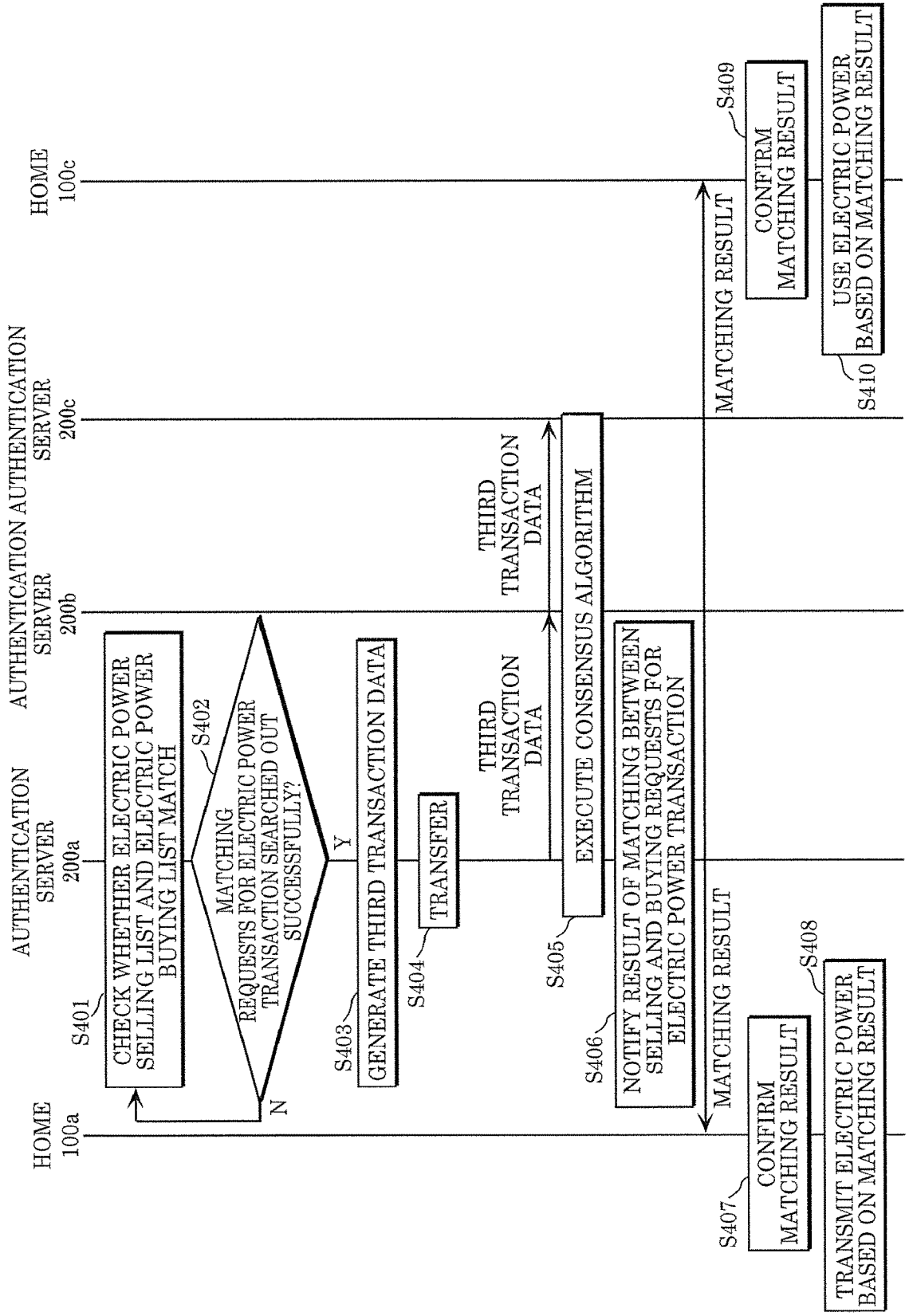
FIG. 14 is a sequence diagram of an electric power transaction processing performed between the two homes and the authentication servers according to the embodiment.
Figure 15:
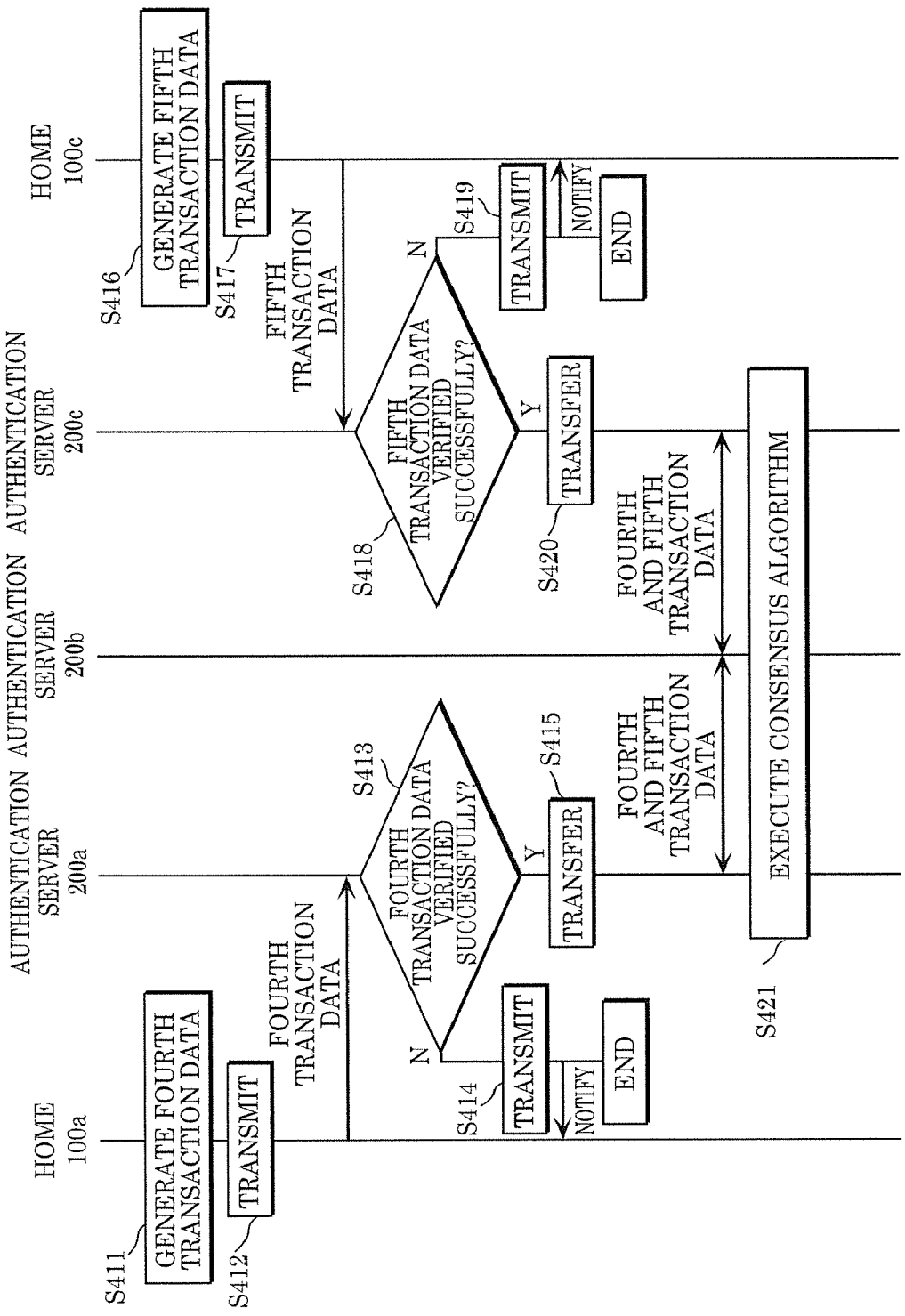
FIG. 15 is a sequence diagram of other electric power transaction processing performed between the two homes and the authentication servers according to the embodiment.

Next, a description is given of an electric power transaction processing performed between home 100a, etc. and authentication server 200a, etc. FIGS. 14 and 15 each is a sequence diagram of electric power transaction processing performed between home 100a, etc and authentication server 200a, etc. according to the embodiment. FIG. 14 illustrates a non-limiting example in which authentication server 200a performs, for example, matching between selling and buying requests for an electric power transaction. Any of the other authentication servers 200b and 200c may perform the matching, etc., and the electric power transaction processing in this case becomes a similar sequence.

First, in Step S401, authentication server 200a performs matching between an electric power selling list and an electric power buying list. Authentication server 200a may check, that is, perform matching between the electric power selling list and the electric powerbuying list periodically or for each event of an electric power selling request or an electric power buying request.

Next, in Step S402, authentication server 200a checks the electric power selling list and the electric power buying list and determines whether matching electric power selling and buying requests for an electric power transaction are searched out successfully. More specifically, authentication server 200a confirms whether or not (i) the data, the electric power amount, and the unit price of the seller having the first blockchain address and (ii) the data, the electric power amount, and the unit price of the buyer having the second blockchain address match (overlap at least partly) respectively. When authentication server 200a determines in Step S402 that no matching electric power selling and buying requests for an electric power transaction is searched out successfully (N in S402), authentication server 200a returns to Step S401 and performs matching between electric power selling and buying requests again.

When authentication server 200a determines in Step S402 that matching electric power selling and buying requests for an electric power transaction are searched out successfully (Y in S402), authentication server 200a generates transaction data (hereinafter, referred to as third transaction data indicating the result of matching between the selling and buying requests for the electric power transaction (S403).

Next, in Step S404, authentication server 200a transfers the generated third transaction data to the other authentication servers 200b and 200c.

Next, in Step S405, authentication servers 200a, 200b, and 200c execute a consensus algorithm. When authentication servers 200a, 200b, and 200c verify that the third transaction data is valid transaction data (that is, verify the validity), each of authentication servers 200a, 200b, and 200c generates a block including the third transaction data. Each of authentication servers 200a, 200b, and 200c records the block including the third transaction data to a corresponding one of the distributed ledgers of storage devices 201a, 201b, and 201c.

Next, in Step S406, authentication server 200a notifies a matching result, which is a result of matching between electric power selling and buying requests for the electric power transaction, indicating details of the electric power transaction. It is to be noted that authentication server 200a may broadcast, as a notification method, a result of matching between the selling and buying requests for the electric power transaction to home 100a, etc. participating in the service each time matching electric power selling and buying requests for an electric power transaction are searched out successfully, or may notify an electric power transaction result to home 100a, etc. periodically.

Next, in Step S407, home 100a, etc. receives the matching result, and checks whether the matching electric power selling and buying requests for an electric power transaction are searched out successfully.

Next, in Step S408, home 100a transmits the electric power to electric power network 500, based on the matching result.

Next, in Step S409, home 100c, etc. receives the matching result, and confirms whether the matching electric power selling and buying requests for an electric power transaction are searched out successfully.

Next, in Step S410, home 100c uses the electric power from electric power network 500 based on the matching result.

Next, as illustrated in FIG. 15, in Step S411, home 100a transmits electric power to electric power network 500, and then generates transaction data (hereinafter, referred to as fourth transaction data) indicating an electric power selling transaction result including the information indicating that the electric power was transmitted.

Next, in Step S412, home 100a transmits the generated fourth transaction data to authentication server 200a. It is to be noted that the fourth transaction data includes the first electronic signature that is the group signature generated using the signature generating key managed by the user in home 100a as described above.

Next, in Step S413, authentication server 200a verifies whether the received fourth transaction data is valid. More specifically, authentication server 200a verifies whether the group signature of the fourth transaction data is valid, and verifies the validity of the fourth transaction data. Authentication server 200a also verifies whether or not the fourth transaction data is consistent with the electric power transaction result included in the third transaction data.

When the fourth transaction data is not verified successfully in Step S413 (N in S413), authentication server 200a transmits an error notification indicating that the fourth transaction data is not verified successfully to home 100a (S414), and ends the processing.

When the fourth transaction data is verified successfully in Step S413 (Y in S413), authentication server 200a transmits the fourth transaction data to the other authentication servers 200b and 200c (S415). The other authentication servers 200b and 200c also verify the received fourth transaction data in the same manner.

In Step S416, home 100c uses the electric power from electric power network 500, and then generates transaction data (hereinafter, referred to as fifth transaction data) indicating the electric power buying transaction result indicating that the electric power was used.

Next, in Step S417, home 100c transmits the generated fifth transaction data to authentication server 200c. It is to be noted that the fifth transaction data includes the second electronic signature that is the group signature generated using the signature generating key managed by the user in home 100c as described above.

Next, in Step S418, authentication server 200c verifies whether the received fifth transaction data is valid. More specifically, authentication server 200c verifies whether the group signature of the fourth transaction data is valid, and verifies the validity of the fifth transaction data. Authentication server 200c also verifies whether or not the fifth transaction data is consistent with the electric power transaction result included in the third transaction data.

When the fifth transaction data is not verified successfully in Step S418 (N in S418), authentication server 200c transmits an error notification indicating that the fifth transaction data is not verified successfully to home 100c (S419), and ends the processing. When the fifth transaction data is verified successfully in Step S418 (Y in S418), authentication server 200c transmits the fifth transaction data to the other authentication servers 200a and 200b (S420). The other authentication servers 200a and 200b also verify whether the received fifth transaction data is valid in the same manner.

Next, in Step S421, authentication servers 200a, 200b, and 200c execute a consensus algorithm. When authentication servers 200a, 200b, and 200c verified that the fourth transaction data is valid transaction data (that is, verify the validity), each of authentication servers 200a, 200b, and 200c generates a block including the fourth transaction data. Each of authentication servers 200a, 200b, and 200c records the block including the fourth transaction data to a corresponding one of the distributed ledgers of storage devices 201a, 201b, and 201c. Likewise, when authentication servers 200a, 200b, and 200c verified that the fifth transaction data is valid transaction data (that is, verify the validity), each of authentication servers 200a, 200b, and 200c generates a block including the fifth transaction data. Each of authentication servers 200a, 200b, and 200c records the block including the fifth transaction data to a corresponding one of the distributed ledgers of storage devices 201a, 201b, and 201c. It is to be noted that the block including the fourth transaction data and the block including the fifth transaction data may be connected to a blockchain different from the block including the first to third transaction data, and recorded in the distributed ledger thereof.

[1.8 Incentive Payment Processing Performed Between the Homes and the Service Server]

Next, a description is given of an incentive payment sequence between home 100a, etc. and service server 300.

FIG. 16 is a sequence diagram of the incentive payment processing performed between home 100a, etc. and service server 300, etc. according to this embodiment. FIG. 16 illustrates a non-limiting example in which an incentive is paid to home 100a. This applies to home 100b, etc.

First, in Step S501, service server 300 generates a request for referring to the distributed ledger, specifically, a request for referring to the fourth transaction data indicating the electric power selling transaction result recorded in the distributed ledger. It is to be noted that service server 300 may generate such a reference request periodically, or may receive a notification that an electric power transaction was performed from authentication server 200a and then generate such a reference request periodically.

Next, in Step S502, service server 300 transmits the generated reference request to authentication server 200a. FIG. 16 illustrates a non-limiting example where service server 300 transmits the reference request to authentication server 200a. Service server 300 may transmit such a reference request to the other authentication server 200b, etc. The reference request may be transmitted to the other authentication servers 200b and 200c, and in such a case a similar sequence of electric power selling request processing in Steps 503 to S506 is performed thereby.

Next, in Step S503, authentication server 200a transmits the block including the fourth transaction data. It is to be noted that authentication server 200a may transmit the whole content of the distributed ledger including the fourth transaction data, or when the content of the distributed ledger was transmitted previously, may transmit only the difference from the previous content.

Next, in Step S504, service server 300 presents the group signature included in the fourth transaction data, and identifies the seller of the electric power who is the user in home 100*a*.

Next, in Step S505, service server 300 pays the incentive to the identified user.

After paying the incentive to the identified user, service server 300 transmits a notification that the incentive was paid in Step S506. It is to be noted that service server 300 may transmit the notification that the incentive was paid to the identified user in home 100*a*.

[1.9 Advantageous Effects, Etc.]

As described above, a signature included in transaction data from a home is a group signature in electric power transaction system 10, etc. according to this embodiment. In this way, even when the electric power selling request list and the electric power buying request list were made public, it is impossible to identify the home indicated in the electric power selling request list and the electric power buying request list based on the transaction data of the blockchain, and thus it is possible to protect the privacy of the users in the respective homes. In this way, electric power transaction system 10, etc. according to this embodiment is capable of avoiding leakage of privacy information.

Electric power transaction system 10, etc. according to this embodiment is also capable of enabling only the service server to present the group signature, which also enables payment of an incentive to the user who performed an electric power transaction in a home.

Even when an unauthorized user who does not need electric power obtains the content of a made-public distributed ledger in a blockchain and made public an electric power buying request list, electric power transaction system 10, etc. according to this embodiment is also capable of disabling identification of a buyer of electric power indicated in the electric power buying request list. For this reason, there is no possibility that electric power is transmitted excessively to the buyer of electric power, which does not make the electric power system unstable. In other words, even if the content of the distributed ledger in which the transaction data of the blockchain is recorded leaked from the authentication server, electric power transaction system 10, etc. according to this embodiment is also capable of continuing the electric power transaction safely while protecting the privacy of the user.

Furthermore, in electric power transaction system 10, etc. according to this embodiment, it is possible to avoid manipulation in electric power transaction since the electric power transaction is performed utilizing a blockchain, and thus it is possible to pay an incentive appropriately.

[2. Other Variations]

Although the present disclosure has been described based on the embodiment, the present disclosure is not limited to the above-described embodiment as a matter of course. The present disclosure encompasses the cases as indicted below.

(1) Although authentication server 200*a*, etc. and service server 300 have been described as separate devices in the above embodiment, one of authentication server 200*a*, etc. may be identical to service server 300.

(2) When transaction data is not been verified successfully, authentication server 200*a*, etc. notifies home 100*a*, etc. of the fact in the above embodiment, but authentication server 200*a*, etc. may notify also service server 300 of the fact.

(3) Service server 300 transmits a notification that an incentive was paid after the payment of the incentive in the above embodiment, service server 300 may generate transaction data after payment of an incentive and then record the fact in the authentication server. The transaction data may include: a blockchain address to which the incentive was paid; information indicating the details of the incentive; and the signature of the service server.

(4) When matching between an electric power selling request and an electric power buying request does not result in an agreement on an electric power transaction, an electric power selling request and/or an electric power buying request may be made again. In this way, it is possible to re-set the settings of the time periods, unit prices of electric power in the electric power selling request and the electric power buying request, thereby being able to determine whether an electric power transaction is agreed upon or not again.

(5) When a user bought electric power based on the electric power buying request, the user may directly pay the incentive to an electric power transaction service company, or may pay the incentive by electric power transaction points obtained by selling electric power previously, or virtual coins.

(6) Service server 300 paid the incentive after the electric power transaction processing in the above embodiment, service sever 300 may pay the incentive to the seller of the electric power who is the user in a home after the buyer of the electric power who is the user in a home performed the payment processing. Alternatively, the buyer may directly pay the incentive to the blockchain address of the seller.

(7) Although whether an electric power transaction is agreed upon or not has been determined by authentication server 200*a*, etc. in the above embodiment, the way of determination is not limited thereto. Authentication server 200*a* may mount in advance a program for determining whether an electric power transaction is agreed upon, and a determination regarding an electric power transaction may be made automatically using a smart contract function of a blockchain.

(8) The unit prices for selling and buying electric power have been input by the users in the above embodiment, but the way of input is not limited thereto. Service server 300 may set the unit price for selling electric power and the unit price for buying electric power, and cause a user to select "approve" or "disapprove". The unit price for selling electric power and the unit price for buying electric power may be changed depending on a time period.

(9) Authentication server 200*a*, etc. has performed matching between the selling and buying requests for the electric power transaction based on the time periods and unit prices in the above embodiment, but the way of matching is not limited thereto. Authentication server 200*a*, etc. may search out matching selling and buying requests based on the easiness in electric power transmission from the seller to the buyer. For example, when electric power is transmitted from a seller's home to a buyer's home via electric power network 500, the electric power in the closest home may be transmitted in the electric power transaction. Alternatively, authentication server 200*a*, etc. may perform matching between electric power selling request and electric power buying request prioritizing a home which loses less electric power in transmission via electric network

500 over other matching candidates. In this way, it is possible to reduce loss of electric power in the whole electric power transaction service.

(10) The user in a seller's home may issue a token for getting the right to use electric power, and the user in a buyer's home may purchase the token. In this way, electric power transaction can be performed directly between the users.

(11) The seller made the electric power selling request in the above embodiment, who makes an electric power selling request is not limited to the user. Controller 101 may make an electric power selling request automatically when the electric power generated by solar photovoltaic power generation equipment 102 exceeds the accumulation capacity of accumulator battery 103 or a preset threshold value. The threshold value may be set by the user, set in advance, or set to the largest electric power amount among those used in home 100*a*, etc. in the past. In this way, it is possible to reduce user's labor for electric power selling processing.

(12) Transaction data has been generated when electric power was transmitted by home 100*a*, etc. in the above embodiment, transaction data may be generated also when electric power generated by solar photovoltaic power generation equipment 102 is self-used in the home. In this way, it is possible to manage the electric power generated in solar photovoltaic power generation equipment 102. Furthermore, when the electric power generated by solar photovoltaic power generation equipment 102, service server 300 may issue incentive points.

(13) The present disclosure includes a data structure for use in a block to be recorded in a blockchain in electric power transaction system 10 according to the above embodiment. More specifically, the data structure according to the present disclosure is associated with: a blockchain address included in a block generated using a user's secret key; electric power selling amount information indicating the amount of electric power which can be sold by the first electric power equipment; a time stamp indicating the date and time period during which the electric power can be sold; and a group signature assigned to a group of users and associated with each user. The electric power selling amount information and the time stamp included in the data structure according to the present disclosure is compared with electric power selling amount information indicating the amount of electric power which can be sold by the first electric power equipment and a time stamp indicating the date and time period during which the electric power can be sold in the matching for an electric power transaction.

(14) Each of the devices according to the above embodiment is, specifically, a computer system including a micro processor, a ROM, a RAM, a hard disc unit, a display unit, a keyboard, a mouse, and so on. The RAM or the hard disc unit stores a computer program recorded therein. The respective devices achieve their functions through the micro processor's operation according to the computer program. Here, the computer program is configured by combining plural instruction codes indicating instructions for the computer, in order to achieve the predetermined functions.

(15) A part or all of the constituent elements of the respective devices may be configured with a single system-LSI (Large-Scale Integration). The system-LSI is a super-multi-function LSI manufactured by integrating constituent units on a single chip, and is specifically a computer system configured to include a microprocessor, a ROM, a RAM, and so on. The RAM stores a computer program stored therein. The system-LSI achieves its function through the microprocessor's operations according to the computer program.

Furthermore, each of the constituent units of the respective apparatuses may be made as separate individual chips, or as a single chip to include a part or all thereof.

The name used here is LSI, but it may also be called IC, system LSI, super LSI, or ultra LSI depending on the degree of integration. Moreover, ways to achieve integration are not limited to the LSI, and exclusive circuit or general purpose processor and so forth can also achieve the integration. Field programmable gate array (FPGA) that can be programmed after manufacturing an LSI or a reconfigurable processor that allows re-configuration of the connection or configuration of an LSI can be used for the same purpose.

Furthermore, when a circuit integration technology for replacing LSIs with new circuits appears in the future with advancement in semiconductor technology and derivative other technologies, the circuit integration technology may be naturally used to integrate functional blocks. Application of biotechnology is one such possibility.

(16) A part or all of the constituent elements constituting the respective devices may be configured as an IC card which can be attached to and detached from the respective devices or as a stand-alone module. The IC card or the module is a computer system configured with a microprocessor, a ROM, a RAM, and so on. The IC card or the module may also be included in the aforementioned super-multi-function LSI. The IC card or the module achieves its functions through the microprocessor's operations according to the computer program. The IC card or the module may also be implemented to be tamper-resistant.

(17) The present disclosure may be implemented as the above-described method. The present disclosure may be implemented as computer programs for executing the above-described method, using a computer, and may also be implemented as digital signals including the computer programs.

Furthermore, the present disclosure may also be implemented as computer programs or digital signals recorded on computer-readable recording media such as a flexible disc, a hard disk, a CD-ROM, an MO, a DVD, a DVD-ROM, a DVD-RAM, a BD (Blu-ray Disc), and a semiconductor memory. Furthermore, the present disclosure may also be implemented as the digital signals recorded on these recording media.

Furthermore, the present disclosure may also be implemented as the aforementioned computer programs or digital signals transmitted via a telecommunication line, a wireless or wired communication line, a network represented by the Internet, a data broadcast, and so on.

The present disclosure may also be implemented as a computer system including a microprocessor and a memory, in which the memory stores the aforementioned computer program and the microprocessor operates according to the computer program.

Furthermore, it is also possible to execute another independent computer system by transmitting the programs or the digital signals recorded on the aforementioned recording media, or by transmitting the programs or digital signals via the aforementioned network and the like.

(18) The above-described embodiment and variations may be combined arbitrarily.

Although only the exemplary embodiment and the variations thereof of the present disclosure have been described in detail above, those skilled in the art will readily appreciate that many modifications are possible in the exemplary embodiment, etc. without materially departing from the novel teachings and advantages of the present disclosure. Accordingly, all such modifications are intended to be included within the scope of the present disclosure.

INDUSTRIAL APPLICABILITY

The electric power transaction system according to the present disclosure is capable of performing electric power transaction by allowing a home to transmit transaction data of electric power information including a group signature and allowing an authentication server to manage the transaction data, while securing user's privacy.

What is claimed is:

1. A method comprising:
   determining a second amount of electric power to be sold and bought between a first electric power equipment and a second electric power equipment, based on electric power selling request information obtained from the first electric power equipment and electric power buying request information obtained from the second electric power equipment;
   causing, by the first electric power equipment, one of a power generation equipment and a battery included in the first electric power equipment to transmit the second amount of electric power to an electric power network, in response to notification of information about the second amount of electric power to the first electric power equipment;
   receiving (i) first transaction data from the first electric power equipment, the first transaction data including: electric power transmitting amount information indicating a first amount of electric power which one of the power generation equipment and the battery included in the first electric power equipment transmitted to the second electric power equipment or (ii) second transaction data from the second electric power equipment, the second transaction data including: electric power receiving amount information indicating a third amount of electric power which one of a power generation equipment and a battery included in the second electric power equipment received from the first electric power equipment; and
   verifying validity of (i) the first transaction data by determining that the electric power transmitting amount information is consistent with the second amount of electric power to be sold and bought between the first electric power equipment and the second electric power equipment and (ii) the second transaction data by determining that the electric power receiving amount information is consistent with the second amount of electric power,
   wherein the first electric power equipment is used by a first user,
   the first transaction data further including a first electronic signature that is associated with the first user and is a first group signature assigned to a first group to which a plurality of users including the first user belong,
   the verifying of the validity of the first transaction data includes verifying that the first electronic signature is valid,
   the second electric power equipment is used by a second user,
   the second transaction data further including a second electronic signature that is associated with the second user and is a second group signature assigned to a second group to which a plurality of users including the second user belong,
   the verifying of the validity of the second transaction data includes verifying that the second electronic signature is valid, and
   the first transaction data and the second transaction data are recorded in a distributed ledger based on successfully verifying the validity of the first transaction data and the second transaction data.

2. The method according to claim 1, further comprising:
   receiving electric power selling and buying requests for an electric power transaction;
   determining, whether or not electric power selling and buying requests are matched; and
   transmitting an instruction to the first electric power equipment indicating that the second amount of electric power of the first electric power equipment is to be transmitted to the second electric power equipment, the instruction is transmitted when the electric power selling and buying requests are matched successfully.

3. The method according to claim 2, further comprising:
   generating third transaction data when electric power selling and buying requests are matched successfully, the third transaction data including the second amount of electric power;
   recording the third transaction data in the distributed ledger; and
   the validity of the first transaction data and the second transaction data is verified based on the second amount of electric power included in the third transaction data, the third transaction data being recorded in the distributed ledger.

4. The method according to claim 1, further comprising:
   before recording the first transaction data or the second transaction data in the distributed ledger, transmitting the first transaction data or the second transaction data to one or more second servers, the one or more second servers each hold the distributed ledger,
   wherein when recording the first transaction data or the second transaction data in the distributed ledger held in each of the one or more servers, a block including the first transaction data or the second transaction data is generated and the block including the first transaction data or the second transaction data is stored in the distributed ledger after each of the one or more servers executes a consensus algorithm.

5. The method according to claim 2, wherein
   the electric power selling and buying requests are matched by executing smart contract function using a processor, the smart contract function being stored in the distributed ledgers, the smart contract function determining whether or not the electric power selling and buying requests has been matched.

6. A computer comprising:
   a processor; and
   a memory that stores a program for causing the processor to execute a method comprising:
   determining a second amount of electric power to be sold and bought between a first electric power equipment and a second electric power equipment, based on electric power selling request information obtained from the first electric power equipment and electric power buying request information obtained from the second electric power equipment;

causing, by the first electric power equipment, one of a power generation equipment and a battery included in the first electric power equipment to transmit the second amount of electric power to an electric power network, in response to notification of information about the second amount of electric power to the first electric power equipment;

receiving (i) first transaction data from the first electric power equipment, the first transaction data including: electric power transmitting amount information indicating a first amount of electric power which one of the power generation equipment and the battery included in the first electric power equipment transmitted to the second electric power equipment or (ii) second transaction data from the second electric power equipment, the second transaction data including: electric power receiving amount information indicating a third amount of electric power which one of a power generation equipment and a battery included in the second electric power equipment received from the first electric power equipment; and verifying validity of (i) the first transaction data by determining that the electric power transmitting amount information is consistent with the second amount of electric power to be sold and bought between the first electric power equipment and the second electric power equipment and (ii) the second transaction data by determining that the electric power receiving amount information is consistent with the second amount of electric power, wherein the first electric power equipment is used by a first user, the first transaction data further including a first electronic signature that is associated with the first user and is a first group signature assigned to a first group to which a plurality of users including the first user belong, the verifying of the validity of the first transaction data includes verifying that the first electronic signature is valid, the second electric power equipment is used by a second user, the second transaction data further including a second electronic signature that is associated with the second user and is a second group signature assigned to a second group to which a plurality of users including the second user belong, the verifying of the validity of the second transaction data includes verifying that the second electronic signature is valid, and the first transaction data and the second transaction data are recorded in a distributed ledger based on successfully verifying the validity of the first transaction data and the second transaction data.

7. A non-transitory computer-readable recording medium having a program recorded thereon for causing a computer to execute a control method comprising:

determining a second amount of electric power to be sold and bought between a first electric power equipment and a second electric power equipment, based on electric power selling request information obtained from the first electric power equipment and electric power buying request information obtained from the second electric power equipment;

causing, by the first electric power equipment, one of a power generation equipment and a battery included in the first electric power equipment to transmit the second amount of electric power to an electric power network, in response to notification of information about the second amount of electric power to the first electric power equipment;

receiving (i) first transaction data from the first electric power equipment, the first transaction data including: electric power transmitting amount information indicating a first amount of electric power which one of the power generation equipment and a battery included in the first electric power equipment transmitted to the second electric power equipment or (ii) second transaction data from the second electric power equipment, the second transaction data including: electric power receiving amount information indicating a third amount of electric power which one of a power generation equipment and a battery included in the second electric power equipment received from the first electric power equipment; and verifying validity of (i) the first transaction data by determining that the electric power transmitting amount information is consistent with the second amount of electric power to be sold and bought between the first electric power equipment and the second electric power equipment and (ii) the second transaction data by determining that the electric power receiving amount information is consistent with the second amount of electric power, wherein the first electric power equipment is used by a first user, the first transaction data further including a first electronic signature that is associated with the first user and is a first group signature assigned to a first group to which a plurality of users including the first user belong, the verifying of the validity of the first transaction data includes verifying that the first electronic signature is valid, the second electric power equipment is used by a second user, the second transaction data further including a second electronic signature that is associated with the second user and is a second group signature assigned to a second group to which a plurality of users including the second user belong, the verifying of the validity of the second transaction data includes verifying that the second electronic signature is valid, and the first transaction data and the second transaction data are recorded in a distributed ledger based on successfully verifying the validity of the first transaction data and the second transaction data.

8. The method according to claim 1, wherein when (i) the electric power transmitting amount information is not consistent with the second amount of electric power or (ii) the electric power receiving amount information is not consistent with the second amount of electric power, the first transaction data or the second transaction data is not recorded in the distributed ledger.

9. The method according to claim 1, wherein when electric power generated by the power generation equipment included in the first electric power equipment exceeds a capacity or a set threshold value of the battery included in the first electric power equipment, the electric power selling request information is automatically generated.

10. The method according to claim 1, wherein the electric power selling request is generated based on determining that an amount of electric power generated by the first electric power equipment exceeds a maximum amount of electric power previously used by the first electric power equipment.

11. The method according to claim 1, comprising:

when electric power is transmitted from the first electric power equipment to the second electric power equipment via the electric power network, electric power in a closest electric power equipment is transmitted in an electric power transaction, or the electric power selling request information and the electric power buying request information are matched together prioritizing an electric power equipment which loses less electric power in transmission via the electric power network over other matching candidates resulting in a reduction in loss of electric power.

* * * * *